May 3, 1932. A. F. PYM 1,856,291
MACHINE FOR RELATIVELY MOVING SHOES AND THEIR LASTS
Original Filed July 24, 1926 7 Sheets-Sheet 1

INVENTOR.
Arthur F. Pym

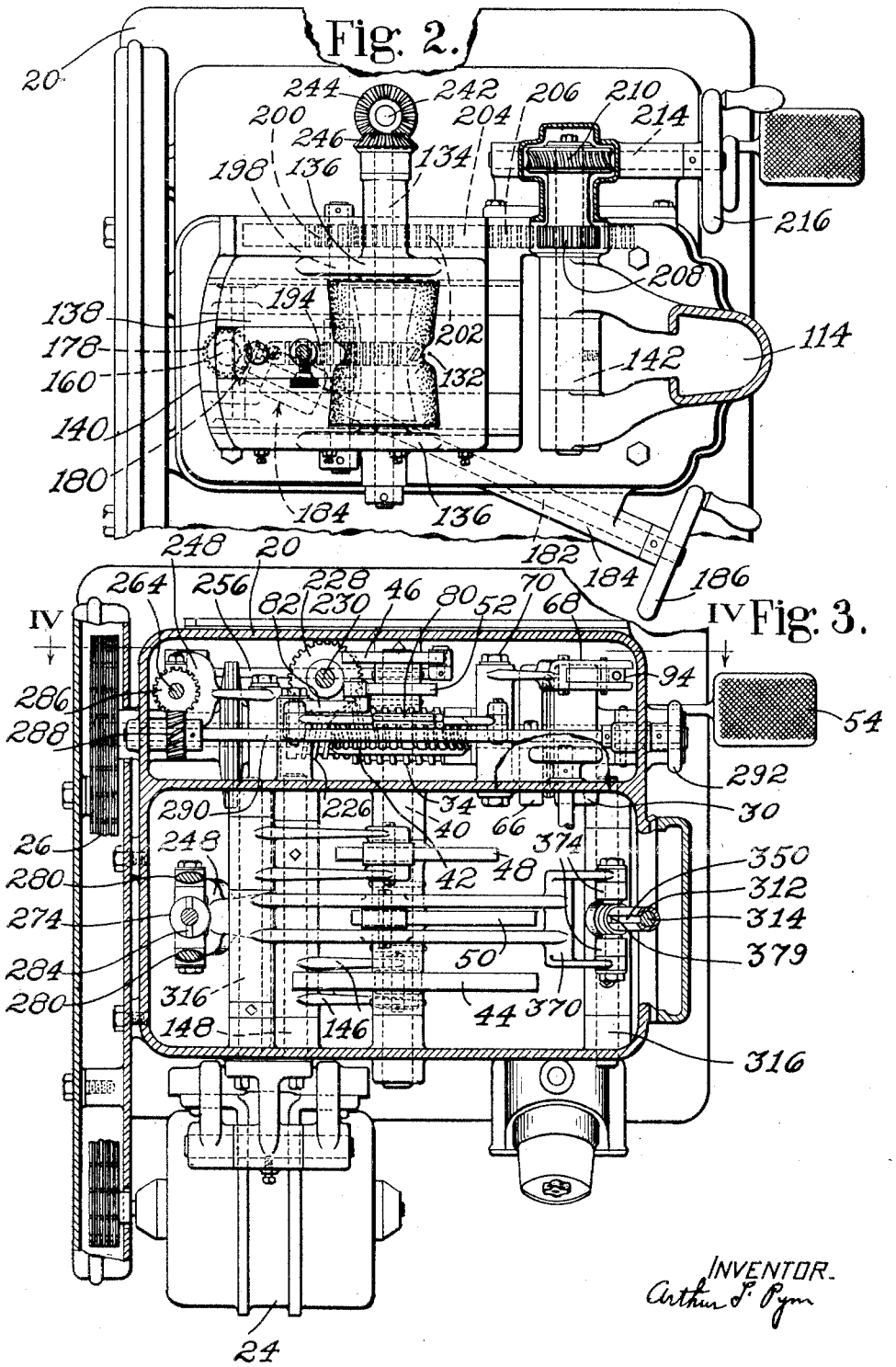

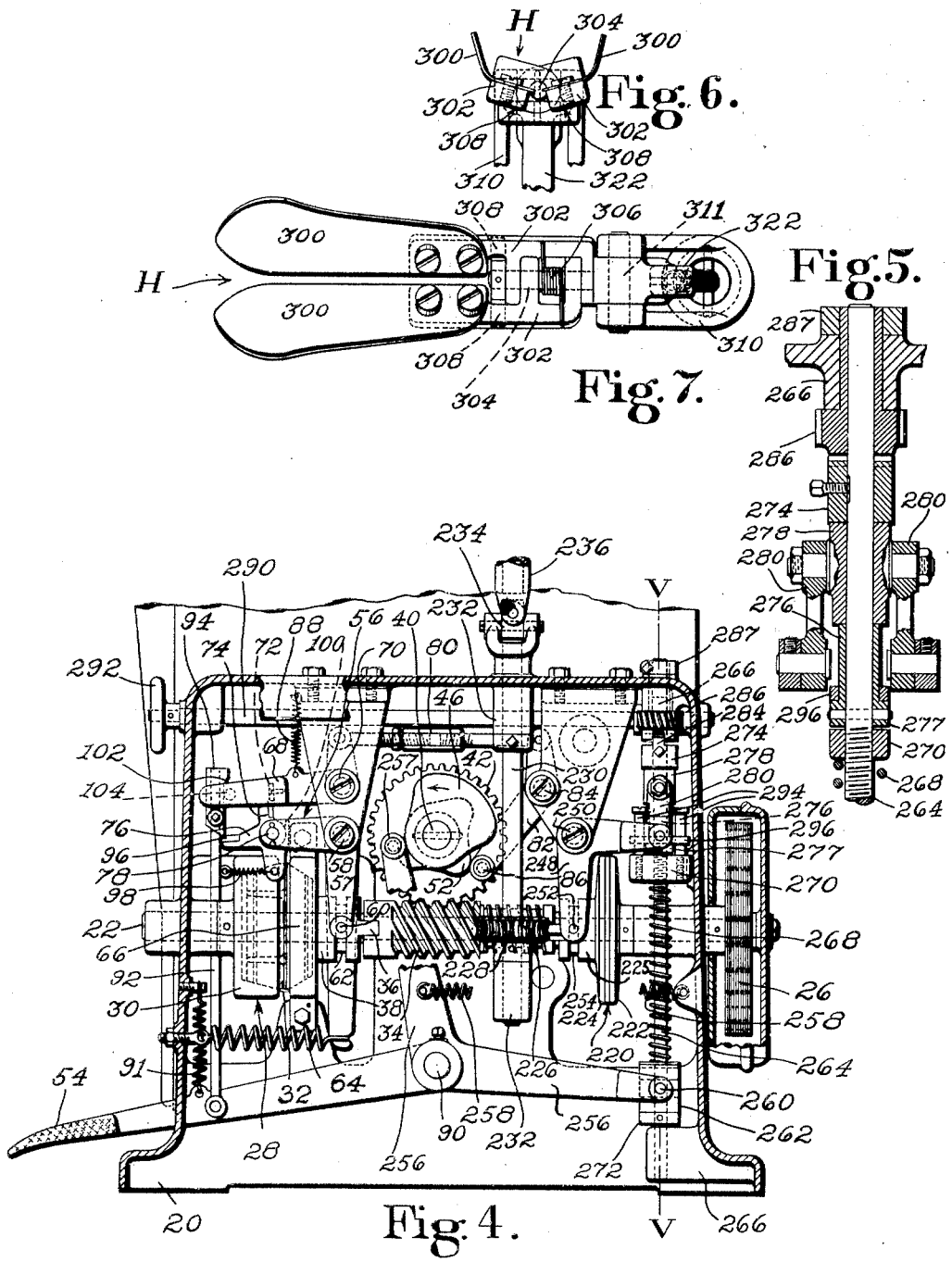

May 3, 1932.  A. F. PYM  1,856,291
MACHINE FOR RELATIVELY MOVING SHOES AND THEIR LASTS
Original Filed July 24, 1926  7 Sheets-Sheet 4
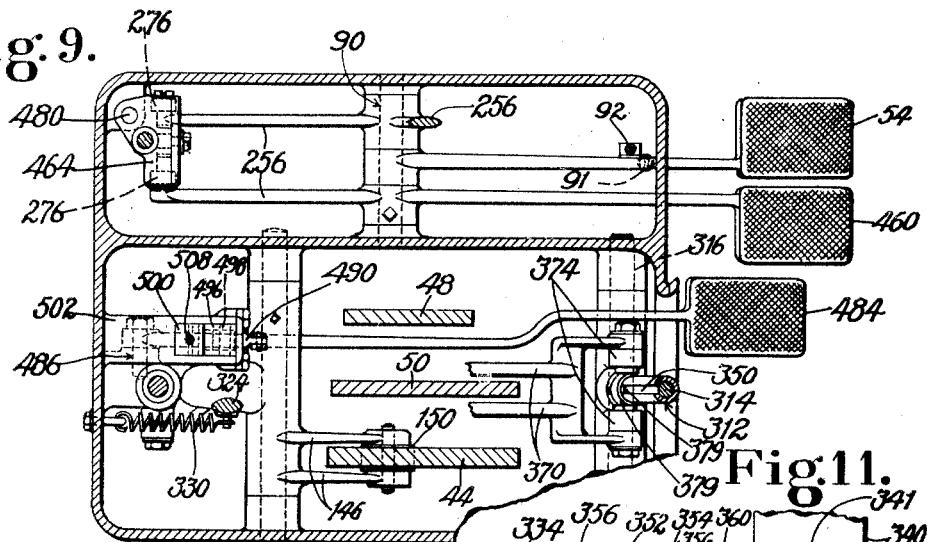
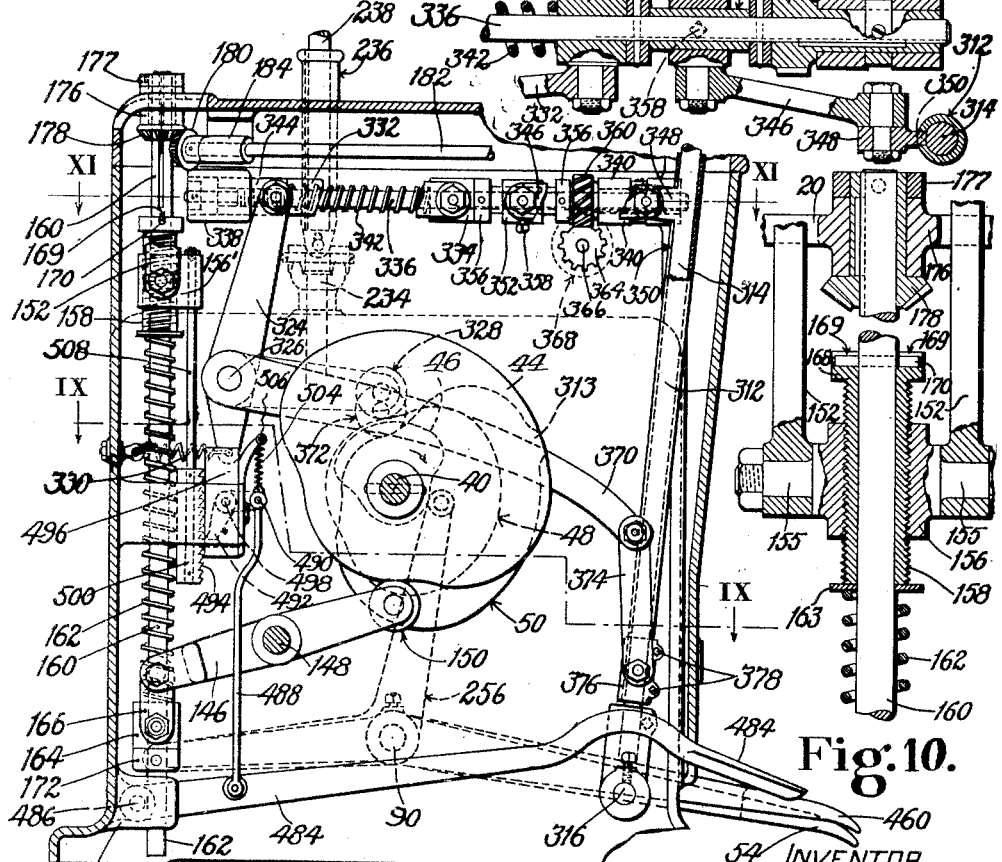

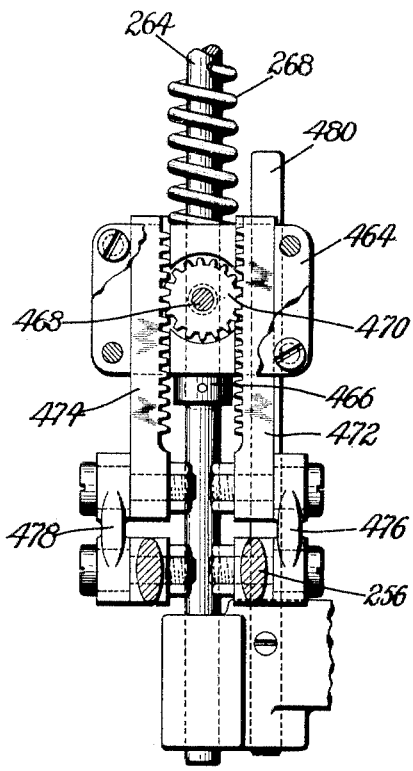
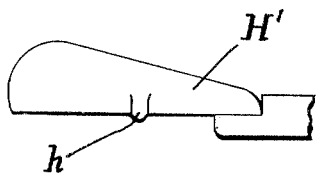
Fig. 14.
Fig. 13.
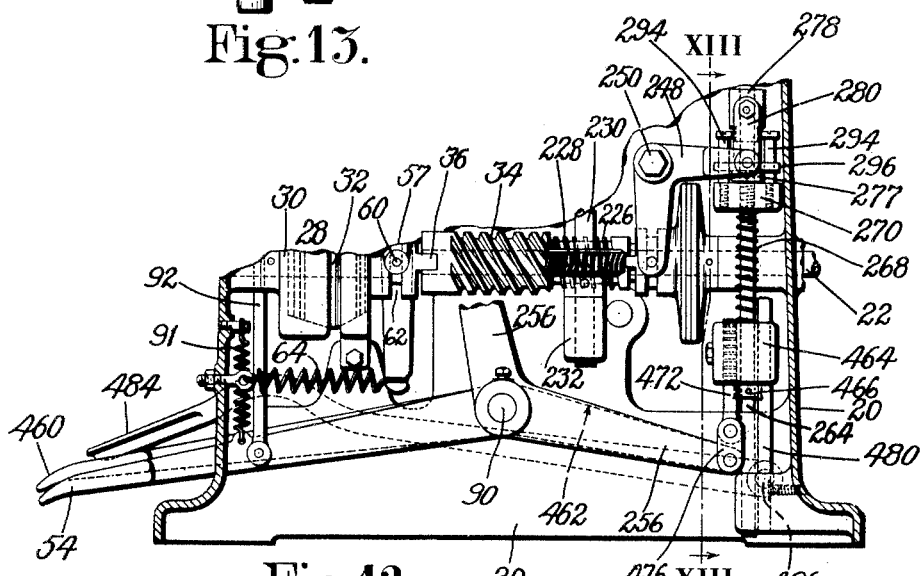
Fig. 12.

May 3, 1932.  A. F. PYM  1,856,291
MACHINE FOR RELATIVELY MOVING SHOES AND THEIR LASTS
Original Filed July 24, 1926  7 Sheets-Sheet 7

INVENTOR
Arthur F. Pym

Patented May 3, 1932

1,856,291

UNITED STATES PATENT OFFICE

ARTHUR F. PYM, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY

MACHINE FOR RELATIVELY MOVING SHOES AND THEIR LASTS

Application filed July 24, 1926, Serial No. 124,664. Renewed July 30, 1930.

This invention relates to machines for relatively moving shoes and their lasts. As herein illustrated, the invention is embodied in a relasting machine of the type set forth in Letters Patent of the United States No. 1,678,164, granted July 24, 1928, on my application, said patent having been reissued as Patent No. 18,186 on September 15, 1931.

In machines of this type the last is stationarily supported and the shoe, after having been partially drawn over the last by hand, is acted upon by a roll and a shoe horn, the roll engaging the tread face of the sole and the horn engaging the inside of the counter portion of the shoe. The roll is pressed firmly against the sole and is rotated by power in a direction to push the shoe rearwardly to seat the toe of the shoe on the last. In order to avoid possible injury to the shoe resulting from continued pushing of the shoe by the roll after the seating of the toe has been completed, provision is made whereby the operator, by releasing a treadle, may stop the rotation of the roll. As an additional safeguard for preventing damage to the shoe in case the operator should fail to release the treadle at the proper time, the roll is adapted to slip relatively to the sole of the shoe if the roll continues to rotate after the toe of the shoe has become seated. While machines thus organized have operated satisfactorily, it has been found difficult, when a machine is run at high speed, for the operator to determine just when to release the treadle in order to stop the rotation of the roll at the instant the toe of the shoe seats against the toe of the last.

With the foregoing in mind, one object of the present invention is further to improve the construction and mode of operation of machines of this type to insure that the pushing action of the relasting roll will be terminated accurately and reliably at the proper time even though the machine is being run at high speed.

To the accomplishment of this object one feature of the present invention consists in the combination, with means for relatively moving a shoe and its last, of mechanism for operating said means constructed and arranged to become inoperative when excessive resistance is offered to said relative movement. As herein exemplified, a relasting roll is moved, by cam-actuated means controlled by a main driving clutch, into engagement with the tread face of the sole of a shoe partially drawn over a last and the roll is rotated to seat the toe portion of the shoe upon the last by power-driven mechanism including an auxiliary friction clutch the members of which are automatically engaged and disengaged and are constructed and arranged to slip relatively to each other when the relasting roll encounters the additional resistance offered by the shoe when the toe of the shoe seats against the last. The members of the illustrated auxiliary friction clutch are held engaged by the pressure of a spring and provision is made for preliminarily adjusting the tension of the spring to vary the amount of resistance required to cause slipping of the clutch and thus to adapt the machine for operation upon different kinds of shoes. In this way the distance traveled by the shoe as it is being pushed upon the last is automatically determined by adjustment of the amount of force which is to be applied by the roll to effect the rearward movement of the shoe.

In the illustrated machine the driving members of the main and auxiliary friction clutches are continuously driven, although normally disconnected from their respective driven clutch members, and the operation of the machine is initiated by depression of a foot treadle which throws in the main clutch to render operative mechanism for automatically controlling the action of the auxiliary clutch and the relasting devices. In order to adapt the machine for a wider range of usefulness, another feature of the invention consists in the provision of mechanism adapted to be actuated directly by the operator of the machine for controlling the action of the toe seating means. As herein exemplified, the seating of the toe of the shoe under the control of the operator is accomplished by use of a second or supplementary foot treadle and connections between said treadle and the spring which tends to hold the members of the friction clutch engaged, these connections being operable, upon depression of the treadle, to compress the spring so as to render the friction clutch operative to drive the relasting roll. This operator-controlled means is capable of acting also in conjunction with the automatic mechanism for controlling the toe seating means to modify the action of the latter when ever such procedure may be desirable. Thus by depression of the second treadle, not only may the clutch spring be compressed sufficiently to rotate the roll to initiate the relasting of the toe but if the relasting operation has been prematurely arrested by the slipping of the clutch members the spring may be further compressed to stop the slipping of the clutch and thus to cause the relasting roll to continue its rotation and its pushing action upon the shoe.

Another feature of the invention consists in the provision of means entirely under the control of the operator and acting independently of the automatic mechanism for moving the relasting roll into and out of work engaging position whereby the operator, at any time in the cycle of operations of the machine, may cause the relasting roll to be retracted from engagement with the work for the purpose of permitting readjustment of the shoe relatively to the last or the performance of some other manual operation upon the shoe. As herein shown, a third treadle and suitable connections between the third treadle and the relasting roll carrier are employed as the operator-controlled means for causing the relasting roll to be moved into and out of work-engaging position independently of the automatic mechanism.

Further to provide for improved relasting of shoes, the invention provides toe and counter seating devices constructed and arranged to co-operate so that each assists and supplements the action of the other in addition to performing its individual functions. This is accomplished, in the illustrated embodiment of the invention, by causing the shoe horn to begin its operation during the action of the relasting roll and to function at this time to exert a rearward pull upon the shoe. Thus the pull exerted by the horn becomes effective to supplement the push of the relasting roll to assist the latter in seating the shoe and in addition the horn guides or directs the shoe while the roll is acting upon it so that the shoe is prevented from being forced too much toward one side or the other of the last. The push of the roll, on the other hand, supplements the pull of the horn and thus makes it easier for the horn to seat the counter portion of the shoe.

Still further to facilitate relasting operations the invention also provides for adjustment of the relasting roll both in accordance with the swing of the last and in accordance with the transverse pitch of the last bottom and preferably, though not necessarily, the means for effecting these adjustments are interconnected so that the adjustments may be made simultaneously by manipulation of a single member which, as herein shown, is movable in one direction to adjust the roll for operation upon a right shoe and in the opposite direction to adjust the roll for operation upon a left shoe.

For adjusting the roll to accommodate the swing of the last, the roll support is mounted for rotary movement to permit angular adjustment, and a pair of stops are provided for limiting the rotary movement of the support, the support being locked by suitable means in a position of angular adjustment as determined by either of the stops. For adjusting the roll to accommodate the transverse pitch of the last bottom, the roll support is also mounted to permit it to be tilted transversely. It will thus be seen that the roll support or frame is mounted for angular adjustment in two different planes, or about two non-parallel axes. Furthermore, by reason of the interconnection of the means for effecting these two adjustments, the adjustment about one axis automatically determines the adjustment about the outer axis. To enable the roll to be brought into contact with the sole of a shoe partially mounted on a last, the roll-carrying frame is mounted for swinging movement about a third axis parallel to the axis of the roll, and it will be apparent that this third axis is non-parallel to either of the other two axes about which the roll-carrying frame may be adjusted to accommodate the swing of the last and the transverse pitch of the last bottom respectively. The frame may also be adjusted along the length of the sole; that is, in addition to rotation about the three axes, it also has a movement of rectilinear translation. It may be secured positively in any position it may assume in its path of movement, and the roll is driven from a source of power regardless of the position of its supporting frame.

Another feature of the invention consists in the provision of a plurality of shoe-engaging members, namely, a roll for operating upon the forward portion of the shoe and a shoe horn for operating upon the counter portion, in which each of the members is actuated through a driving connection from a source of power, and each of the driving connections may be disconnected from the source of power. Mechanism is provided for driving the shoe-engaging members in a cycle, and additional means are provided for controlling one of the members independently of the mechanism.

Other objects and features of the invention will be apparent from the following description, reference being had to the accompanying drawings in which:—

Fig. 2 is a top plan view of the machine shown in Fig. 1 with the standard which supports the last pin broken away;

Fig. 3 is a horizontal sectional view taken below the plane of the relasting roll carrier;

Fig. 4 is a vertical sectional view taken substantially along the line IV—IV of Fig. 3;

Fig. 5 is a detail sectional view taken along the line V—V of Fig. 4;

Fig. 6 is a detail view in end elevation of the shoe horn;

Fig. 7 is a plan view of the horn shown in Fig. 6;

Fig. 8 is a vertical sectional view of the lower portion of the machine fitted with supplementary treadle mechanism whereby the operator may directly control the action of the relasting roll;

Fig. 9 is a horizontal sectional view of the portion of the machine shown in Fig. 8, showing particularly the treadle mechanism for retracting the relasting roll from the shoe, the section being taken substantially along the line IX—IX of Fig. 8;

Fig. 10 is a detail sectional view taken along the line X—X of Fig. 1;

Fig. 11 is a detail sectional view taken along the line XI—XI of Fig. 8;

Fig. 12 is a fragmentary view in vertical section showing particularly the treadle mechanism for controlling the action of the relasting roll;

Fig. 13 is a detail sectional view on an enlarged scale taken along the line XIII—XIII of Fig. 12;

Fig. 14 is a detailed view showing a modified construction of shoe horn;

Figure 1:
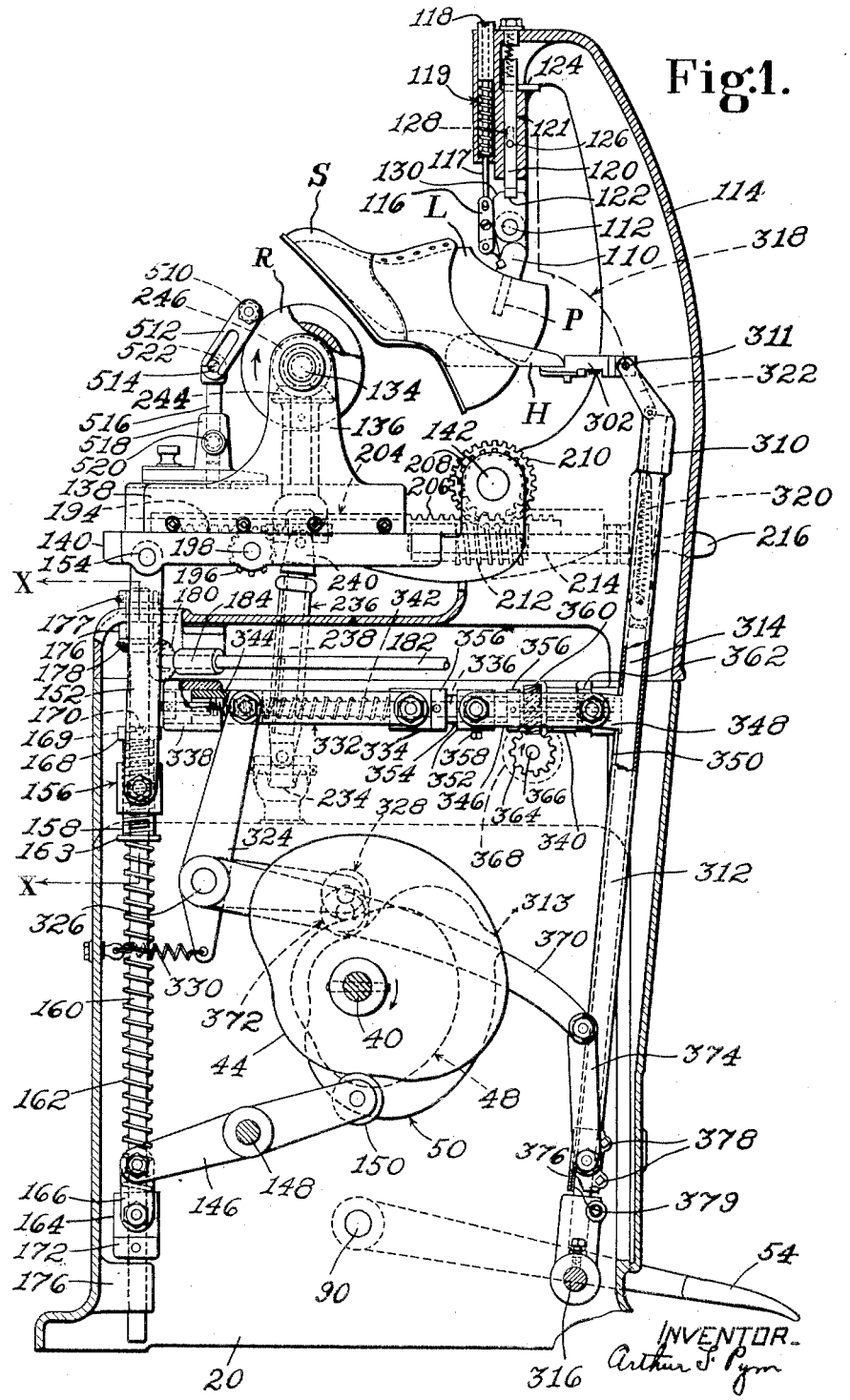
Fig. 1 is a vertical section of a relasting machine showing an embodiment of the present invention, the mechanism being viewed from the left-hand side of the machine.

In the drawings L designates a last and S designates a shoe which is being mounted upon the last. The instrumentalities for mounting the shoe on the last comprise a friction roll R and a shoe horn H. These instrumentalities operate upon the shoe after it has been partially drawn over the last by hand and after the last has been mounted upon a last pin P and swung into the position shown in Fig. 1 wherein the forepart of the sole is located just above but out of contact with the roll R and the horn closely underlies the heel-seat surface of the last bottom and extends into the counter portion of the shoe. In the illustrated machine provision is made for automatically stopping the action of the machine at three points in each cycle of operations thus dividing each cycle into three parts or, in other words, causing the relasting of the shoe to be performed progressively in three distinct stages. It is to be understood, however, that the machine may be designed to perform the relasting operation in either more or less than three stages as may be found desirable, the number of stops in the automatic action of the machine being determined largely with reference to the amount of experience and skill of the operator, and it being practicable, if the operator is sufficiently skillful, to eliminate all stops and thus to make the relasting operation continuous and entirely automatic.

Each of the three stages of operation of the illustrated machine is initiated by the operator and the action of the relasting instrumentalities is arrested automatically at the end of each stage to enable the shoe to be adjusted or the relasting to be assisted manually if desired. During the first stage of a cycle of operations of the machine shown in Figs. 1 to 4, inclusive, the roll R is moved upwardly under heavy spring pressure into engagement with the forepart of the sole of the shoe. During the second stage or step in the cycle the roll R and the horn H are both operated to complete the mounting of the shoe upon the last, the roll being rotated in the direction of the arrow in Fig. 1 and the horn being rocked about the rear edge of the last bottom and caused successively to assume the various positions indicated in Figs. 18 to 21, inclusive, and the roll being finally lowered to disengage it from the sole of the shoe so as to permit the last, with the shoe mounted thereon, to be removed from the machine. The third stage of the cycle is for the purpose of returning the shoe horn to operative position below the last pin in readiness for operation upon another shoe.

The roll R and the horn H are operated by mechanism most of which is enclosed within a casing 20. This mechanism derives its motion from a horizontal main shaft 22 (Fig. 4) which is journaled in bearings in the casing 20 and is driven by an electric motor 24 (Fig. 3) through a sprocket chain 26. The main shaft 22 revolves continuously so long as the machine is in operation but, in the illustrated machine, the progress of the relasting operation upon each shoe is controlled by the operator through the medium of a main clutch 28 comprising a friction driving member 30, pinned to the main shaft 22, and a driven member 32 which is rotatably and slidably mounted on the shaft. The driven clutch member 32 is arranged to drive a worm 34 upon the main shaft 22 through tongue-and-slot connections (indicated at 36 in Fig. 4) between the worm and a hub 38 on the clutch member. The worm 34 is loosely mounted on the shaft 22 and drives a horizontal cam shaft 40 through a worm wheel 42 which is fast on the cam shaft. Fixed on the cam shaft is a cam 44 (Fig. 1) which effects the raising and lowering of the relasting roll R, a cam 46 (Fig. 4) which controls the mechanism for rotating the relasting roll, two cams 48 and 50 (Fig. 1) which function through intervening mechanism to operate the shoe horn H, and a fifth cam 52 (Fig. 4) hereinafter referred to as the stop cam, which functions to throw out the main clutch 28 at predetermined points in each cycle of operations, thus dividing each cycle into the plurality of stages or steps above referred to.

The separate stages of each cycle of operations of the machine are initiated by depressing a foot treadle 54 which is connected by mechanism best shown in Fig. 4 to trip a spring-pressed clutch shifting lever 56 for the purpose of throwing in the main clutch 28. The clutch shifting lever 56 is mounted on a fixed pivot 58 and is made in the form of a bell crank having a downwardly extending arm which is yoked at 57 to straddle the hub 38 of the driven clutch member 32. The yoked arm of the lever 56 carries pins 60 which are located at opposite sides of the hub 38 and project into an annular groove 62 therein for the purpose of sliding the driven clutch member 32 on the shaft 22 when the lever 56 is rocked. A spring 64, one end of which is secured to an extension of the yoked arm of the lever 56, tends to swing said lever in a direction to throw in the main clutch. The driven clutch member 32 is formed with a conical peripheral surface at one end for frictionally engaging a complemental surface upon the interior of the driving clutch member 30 and with another conical peripheral surface at its opposite end for engaging within a stationary brake band 66 when the main clutch is thrown out by the action of the lever 56.

Between successive stages of each cycle of operations the members of the main clutch are held out of engagement with one another by means of a latch lever 68 which is also in the form of a bell crank and which is mounted upon a fixed pivot 70 above the clutch shifting lever 56. The longer arm of the latch lever 68 is yoked and carries, between the sides of its yoked portion, a lug 72 arranged to engage an ear 74 formed on a dog 76 which is pivoted at 78 to the forwardly extending arm of the clutch shifting lever 56. The shorter or upwardly extending arm of the latch lever 68 is connected by a link 80 with one end of a cam lever 82 which is mounted to turn about a fixed pivot 84. At its opposite end the cam lever 82 carries a cam roll 86 arranged to be engaged by the stop cam 52. A spring 88, one end of which is secured to the latch lever 68, tends to swing the latch lever upwardly and serves to hold the cam roll 86 against its cam. When the latch lever 68 occupies the position in which it appears in Fig. 4 the lug 72, by engagement with the dog 76, serves to hold the driven member 32 of the main clutch disengaged from the driving member 30 against the force of the spring 64. The dog 76 is adapted to be tripped, upon depression of the foot treadle 54, to disengage it from the latch lever 68 and thus enable the spring 64 to rock the lever 56 so as to throw in the main clutch. To this end, the foot treadle 54 (which is pivoted upon a fixed horizontal rod 90 and is urged upwardly by a spring 91) is connected by means of a link 92 with a block 94 which extends within the yoked extremity of the latch lever 68. The lower end of the block 94 overlies a tail 96 on the dog 76, the arrangement being such that upon depression of the treadle 54 the dog 76 will be rocked in a counterclockwise direction, as viewed in Fig. 4, against the action of a spring 98 which connects the lower portion of the dog 76 with the link 92, and which tends to hold the dog in the normal position determined by a stop-shoulder 100 on the dog which is adapted to engage a suitable abutment surface on the forwardly-extending arm of the lever 56. The above-described rocking movement of the dog 76 will disengage the ear 74 from the lug 72, thus releasing the lever 56 to the action of the spring 64, and will result in the rocking of said lever in a direction to throw the driven member of the main clutch 28 out of engagement with the brake band 66 and into engagement with the driving member of the clutch. Thereupon the worm 34 will be connected to turn with the main shaft 22, and the cam shaft 40 with the several cams thereon, will be driven until the main clutch is automatically thrown out at the termination of the first stage of a cycle of relasting operations.

The throwing out of the main clutch 28 is effected by a positive downward movement of the latch lever 68 derived from the stop cam 52 through connections already described. To enable the latch lever to operate in this manner to throw out the main clutch, the dog 76 must first be released from its tripped position and this is accomplished during the final portion of the downward movement of the foot treadle 54 by means of a cam face 102 on the block 94 which functions, by engagement with a pin 104 on the latch lever 68 to swing the block 94 toward the left in Fig. 4, out of engagement with the tail 96 of the dog 76. The dog 76 is then rocked by the spring 98 to engage the ear 74 with the side face of the lug 72 and when, at the latter part of the first stage of the cycle, the stop cam 52 causes the latch lever 68 to be lifted, the dog 76 will be rocked to a position directly beneath the lug 72, as determined by the stop shoulder 100. Thus when the latch lever is rocked downwardly, as above described, the clutch shifting lever 56 will be actuated to move the driven member of the main clutch 28 away from driving member thereof and into engagement with the brake band 66, whereupon the rotation of the cam shaft 40 will be immediately arrested. The second and third stages of each cycle of operations are also initiated by depression of the foot treadle 54 which causes the main clutch shifting mechanism to operate in the manner just described. Suitably arranged projections are provided on the stop cam 52 to effect automatic termination of the second and third stages of the cycle at the proper times.

Figure 22:
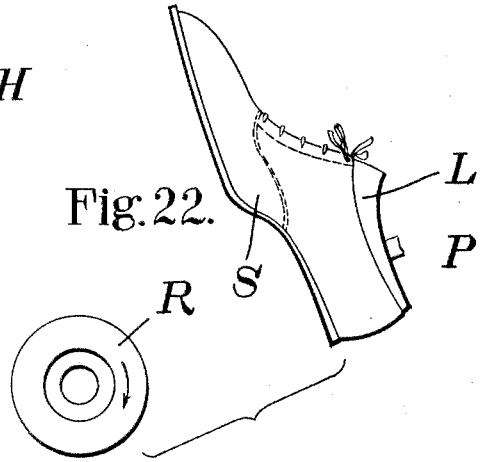

Before the first stage in a cycle of operations is initiated a shoe is partially drawn over a last by hand and this may be done either before or after the last has been placed upon the last pin P. The last pin P projects from a carrier 110 (Fig. 1) pivoted at 112 to the lower free extremity of a goose neck extension 114 of the frame or casing 20, this extension being shaped as shown to avoid interference with the upper of a high shoe or with the necessary upward movement of the shoe horn H. The carrier 110 is capable of turning about the pivot 112 to move the last pin from the last receiving position shown in Fig. 22 to the position shown in Fig. 1, wherein the last is located for the performance of the relasting operation. In order that the last pin shall be yieldingly maintained in position to receive a last, the carrier 110 is connected through a link 116 and a rod 117 with an upwardly spring-pressed plunger 118 which is guided for vertical sliding movement within a bore 119 in the solid extremity of the goose neck 114. To hold the last rigidly in position for the relasting of a shoe thereon a spring-pressed latch bar 120, arranged to slide vertically within a guideway 121 in the extremity of the neck 114, is shaped at its lower end to enter a notch 122 in the last pin carrier 110. The latch bar 120 is adapted to be tripped automatically to release the last pin carrier 110 at the end of each relasting operation, so that the last may be swung upwardly to facilitate the removal of the relasted shoe from the machine. For this purpose a pin 124 projects from the latch bar into the path of the carrier for the shoe horn H which will hereinafter be described. To enable the latch bar 120 to be tripped manually, if desired, to permit removal of the shoe before the completion of the relasting operation, another pin 126 in the latch bar extends through a slot 128 in the latch bar housing into a position to be conveniently manipulated by the operator. The lower end of the latch bar 120, by engagement with a flat face 130 in the last pin carrier 110 serves to steady the latter when in last-receiving position without positively locking it, thus leaving it free to swing downwardly without requiring manual tripping of the latch bar whenever a last has been placed on the last pin.

After a last with a shoe partially drawn thereover has been positioned as shown in Fig. 1 the relasting roll R is operated to start the mechanical relasting of the shoe. The roll R may be made of comparatively soft yielding rubber and shaped as best shown in Fig. 2, the peripheral surface of the roll tapering somewhat from the opposite ends of the roll toward an annular groove 132 at the middle of the roll, this shape facilitating effective action of the roll in connection with shoes on lasts having certain characteristics as will be more fully explained hereinafter. The roll R is rigidly secured in any suitable manner upon a horizontal shaft 134 journaled in bearings 136 on a slide or support 138 which is mounted on a carrier 140 for adjustment toward the front or rear of the machine to vary the points lengthwise of the shoe at which the sole is to be engaged by the relasting roll. The front portion of the relasting roll carrier 140 is pivoted upon a horizontal shaft 142 journaled in the upper portion of the casing 20 so that the carrier 140 is adapted to rock about the shaft 142 to raise or lower the roll R so as to move it into and out of frictional engagement with the shoe. The shaft 142, as shown, is located approximately beneath the last pin P and the arrangement is such that the relasting roll is enabled to swing toward the shoe through a path so disposed relatively to the shoe bottom that the pressure of the roll will have no tendency to move the shoe forwardly of the last but, on the contrary, may have some tendency to move the shoe rearwardly of the last (but forwardly with respect to the machine) even before the roll begins to rotate.

To effect the raising and lowering of the relasting roll R the rearward portion of the roll carrier 140 is connected with a cam lever 146 which is pivoted upon a fixed rod 148 and carries a cam roll 150 arranged to ride on the periphery of the cam 44. The connections between the relasting roll carrier 140 and the cam lever 146 comprise a pair of parallel links 152 the upper ends of which are pivoted at 154 to the rearward end of the carrier 140. The lower ends of the links 152 are pivoted at 155 (see Fig. 10) to a nut 156 threaded upon a sleeve 158 through which extends a vertical rod 160, the rod being slidably and rotatably mounted in bearings 176 (Fig. 1) formed within the casing 20, and being capable of sliding and turning within the sleeve 158. A spring 162 surrounds the rod 160 between a washer 163 held against the lower end of the threaded sleeve 158 and a second sleeve 164 which is slidingly mounted upon the lower portion of the rod 160 and which is connected by means of links 166 with the forward end of the cam lever 146. The upper end of the sleeve 158 is provided with a head 168 which is notched, as indicated at 169—169, to receive the opposite projecting ends of a pin 170 which extends through the rod 160, and a stop collar 172 is pinned to the rod 160 just above the lower bearing 176 and is adapted to engage the lower end of the sleeve 164. The spring 162 is thus confined between the sleeves 164 and 158 and normally is held under more or less compression thereby.

Figure 17:
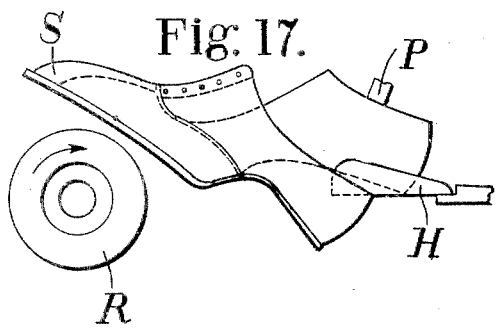
Figs. 17—22, inclusive, are diagrammatic views illustrating the mode of operation of the machine by showing the various positions of the relasting roll and the shoe horn relatively to a shoe and its last.
Figure 18:
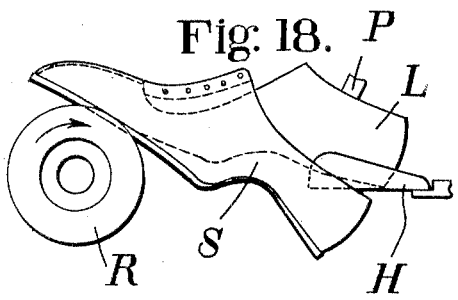
Figure 19:
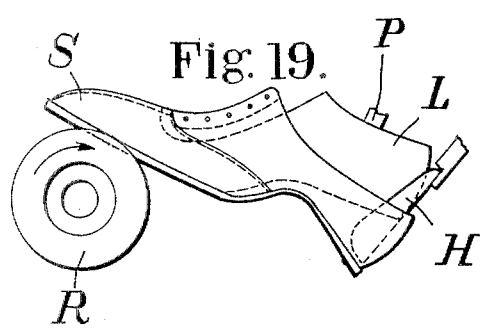
Figure 20:
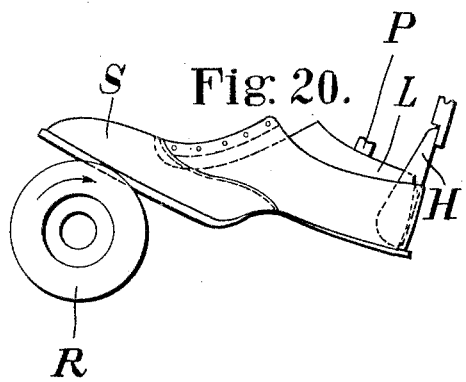
Figure 21:
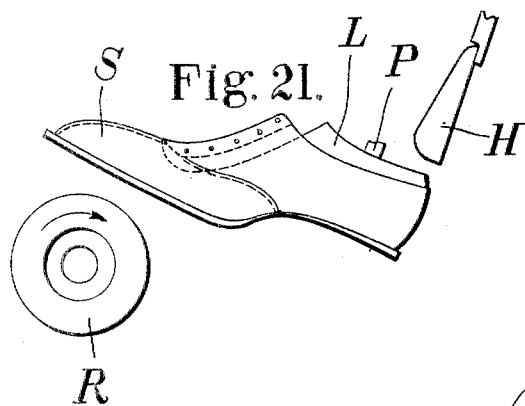

When the cam 44 becomes operative to raise the rearward end of the lever 146 and the sleeve 164, the spring 162 then functions yieldingly to raise the sleeve 158 and the nut 156 and, through the links 152, to swing the roll carrier 140 upwardly and thus to raise the relasting roll R into engagement with the bottom of the shoe. Thereupon upward movement of the upper sleeve 158 is arrested while continued upward movement of the cam lever 146 and the lower sleeve 164 serves to increase the compression of the spring 162 so that the relasting roll R is caused to apply the desired heavy pressure to the work. After this heavy pressure has been maintained for a sufficient period of time the cam 44 permits the lever 146 to swing downwardly, thereby first relieving the compression of the spring 162, and thereafter removing the relasting roll from engagement with the shoe and lowering it into its normal inoperative position as indicated in Fig. 17.

In order that the amount of heavy pressure to be applied to the shoe may be predetermined and varied at will by the operator, provision is made for adjusting the normal or initial elevation of the relasting roll or the location of this roll relatively to the shoe when the roll is in its lowered position. To this end, there is splined to the upper portion of the rod 160 a beveled pinion 178 (see particularly Fig. 10) the hub of which is journaled within the upper bearing 176. As best shown in Fig. 10 a collar 177 fixed upon the upper end of the hub of the pinion 178, retains the hub within its bearing. The pinion 178 meshes with a beveled pinion 180 on a horizontal shaft 182 journaled in bearings 184 (Fig. 2) and carrying at its forward end a hand wheel 186 which is located within convenient reach of the operator and by means of which the shaft 182 may be turned to rotate the rod 160 and, through the pin-and-notch connections 169, 170 between the rod 160 and the sleeve 158, to turn this sleeve within the nut 156, thereby raising or lowering the nut and correspondingly raising or lowering the carrier 140 and the relasting roll R. By adjusting the normal elevation of the roll R in this way the distance to be traveled by the roll before engaging the work will be varied and consequently the length of stroke of the cam lever 146 which is effective to compress the spring 162 will be correspondingly varied. Thus, if the normal elevation of the roll R is made lower the roll will have to move farther before engaging the work and a correspondingly shorter portion of the movement of the cam lever 146 will then be effective to compress the spring 162, with the result that less pressure will be applied to the work. On the other hand, if the normal elevation of the roll R is made higher a greater part of the stroke of the cam lever 146 will be effective to compress the spring 162 and more pressure will be applied to the work. The head 168 together with the washer 163 insure that the sleeve will not be disengaged from the nut 156 accidentally by adjustment of the hand wheel 186, the said head 168 and washer 163 limiting respectively the upward and downward movements of the nut on the sleeve.

In order that the relasting roll R may be adjusted to vary the location lengthwise of the shoe at which the roll is to engage the sole and in order that the roll may be adjusted forwardly or backwardly in accordance with the size of the shoe, the following provision is made for adjusting the slide 138 relatively to the roll carrier 140. As shown in Figs. 1 and 2, a rack bar 194 secured to the lower side of the slide 138 is engaged by a pinion 196 fast on a shaft 198 mounted to turn in the carrier 140. A second pinion 200 (Fig. 2) also fast on the shaft 198, meshes with rack teeth 202 formed on the lower side of a bar 204 which is mounted in a slideway in the roll carrier 140. On the upper side of the bar 204 is formed a second series of rack teeth 206 which mesh with the teeth of a pinion 208 fast on the shaft 142 about which the roll carrier 140 swings. A worm gear 210, also fast on the shaft 142, is engaged by a worm 212 on a horizontal shaft 214 which is journaled in bearings on the upper portion of the casing 20. The shaft 214 has secured to its forward end a hand wheel 216 by which it may be turned to rotate the shaft 142 and slide the rack bar 204 to turn the shaft 198 and thereby to adjust the slide 138 forwardly or backwardly with respect to the roll carrier 140. On account of the employment of a worm and worm wheel in the train of gearing for effecting this adjustment the roll carrier slide 138 will be locked in any position into which it is moved by means of the hand wheel 216.

The relasting roll R is driven from the main shaft 22 through an auxiliary friction clutch 220 (Fig. 4), the members of which are arranged to slip if excessive resistance is offered to the turning of the roll during the relasting operation. The clutch 220 is adapted to be thrown in and out through mechanism actuated by the cam 46 on the cam shaft 40, thus providing for automatic control of the operation of the relasting roll. The friction clutch 220 comprises a driving clutch member 222 which is in the form of a disk and which is pinned to the main shaft, and a driven clutch member 224 which is also in the form of a disk and which is rotatably mounted on the main shaft beside the driving clutch member and is slidable on the shaft in order that it may be moved toward and from the driving member so that the sides of the two clutch members may be brought into and out of frictional driving engagement with one another. The hub 225 of the driven clutch member 224 is splined to the hub of a worm 226 which is rotatably mounted upon the main shaft 22. The worm 226 drives a worm wheel 228 which is fast on a vertical shaft 230 journaled in bearings 232 on the casing 20. The shaft 230 is connected by a universal joint 234 with a sleeve 236 (Fig. 1) within which is arranged to telescope a shaft 238 connected by a universal joint 240 with a vertical shaft 242 which is mounted to turn on the roll carrier slide 138. Secured to the upper end of the shaft 242 is a bevel pinion 244 which drives a bevel pinion 246 that is fast on the upper end of the shaft 134 which carries the relasting roll. The universal joints 234 and 240 and the sliding telescopic connection between the shafts 230 and 242 permit the necessary swinging of the roll carrier 140 to enable the relasting roll to be moved into and out of engagement with the work and these connections also permit adjustment of the roll carrier slide 138 lengthwise of the last for the purposes hereinbefore described.

The driven member of the friction clutch 220 is operated to throw the clutch in or out by means of a bell crank lever 248 (Fig. 4) mounted to rock about a fixed pivot 250 and having a downwardly extending arm which is forked to straddle the hub of the driven clutch member 224, the forked arm bearing pins 252 which project into an annular groove 254 in the hub of said clutch member. The bell crank lever 248 is rocked by means of the cam 46 operating through a cam lever 256 which is pivoted upon the shaft 90 and carries a cam roll 257 which rides on the cam, the cam roll being held against the cam by the action of a spring 258 which is secured at one end to the lever 256 and at its opposite end to a portion of the casing 20. The cam lever 256 is connected with the bell crank lever 248 through the following connections. The rearwardly extending arm of the cam lever 256 is forked and provided with pins 260 which are received in suitable grooves formed in the opposite sides of a rectangular block 262. The block 262 is loosely mounted upon the lower portion of a vertical rod 264 which is both slidably and rotatably mounted in bearings 266 on the inside of the casing 20. A spring 268 surrounds the rod 264 between the block 262 and a nut 270 which is threaded on the rod 264, and a stop collar 272, which is pinned to the rod 264 beneath the block 262, limits the downward movement of the sleeve under the action of the spring 268 and functions to maintain the spring normally under a certain amount of compression. Rigidly secured to the rod 264, above the nut 270, are two collars 274 and 276, the latter having a flanged lower extremity 277, and a sleeve 278 is loosely mounted upon the rod between these collars and is connected by means of links 280 with the bell crank lever 248. With this construction, when the rearwardly extending arm of the cam lever 256 is rocked upwardly the rod 264 will be raised yieldingly by the action of the spring 268 upon the nut 270 and consequently the sleeve 278 will be raised together with the rod 264 and, through the links 280, the bell crank lever 248 will be rocked in a direction to throw in the friction clutch 200 to start the rotation of the relasting roll R. If at any time while the members of the friction clutch are engaged the resistance offered by the shoe to the turning of the relasting roll is sufficient to overcome the force of the spring 268 which yieldingly holds the clutch members engaged, the clutch members will slip and the relasting roll will stop turning, thus avoiding damage to the shoe.

In order that the amount of friction between the relasting roll and the shoe may be predetermined and regulated to secure the desired results provision is made for preliminary adjustment of the amount of initial compression of the spring 268 so that the force which holds the friction clutch members engaged may be varied as desired. This is accomplished by rotating the rod 264 to raise or lower the nut 270. In order that the rod 264 may be conveniently rotated for this purpose the collar 274 has a tongue and groove connection 284 with the hub of a spiral gear 286 which is splined on the rod 264, this construction permitting the rod 264 to slide vertically relatively to the gear 286 without interfering with driving connections between said gear and the collar 274. As shown the hub of the gear 286 extends upwardly through the upper bearing 266 and a collar 287 fixed to the upper end of the hub retains the latter within its bearing. The gear 286 is engaged by a gear 288 (Fig. 3) on a horizontal shaft 290 mounted to turn in bearings in the casing 20 and carrying at its forward extremity a hand wheel 292, the hand wheel being located on the outside of the casing 20 and within convenient reach of the operator. When the hand wheel is turned the rod 264 will also be turned and the nut 270 will be raised or lowered to tighten or loosen the spring 268. By adjustment of the tension of the spring 268, as above described, the power which the clutch 220 will transmit without slipping may be varied, and the power transmitted by the roll R correspondingly varied. To insure that the nut 270 will not accidentally become disengaged from the threads on the rod 264 a pair of studs 294 project upwardly from the nut 270 through apertures in an annular plate 296 which surrounds the collar 276 above its flanged or enlarged lower extremity 277. The flange 277 on the bottom of the collar 276 limits the upward range of adjustment of the nut while heads formed on the studs 294 are arranged to engage the plate 296 to limit the downward range of adjustment of the nut and in this manner the nut is prevented from becoming disengaged with the threads on the rod. The studs 294 also prevent the nut 270 from turning with the rod 264.

The horn for mounting the counter portion of the shoe on the last may be of one piece or any suitable construction but as herein shown it is made in two parts 300, 300 (Figs. 6 and 7) divided along the longitudinal center of the horn. The parts 300, or the corresponding part if a one-piece horn is employed, may be of the more or less angular transverse contour shown in Fig. 6, or they may be and often are curved in arcs of circles of such radius that the transverse curvature of the horn will be substantially concentric with the center of curvature of the rear edge of the bottom of a last on the last pin. Normally the parts of the horn H are yieldingly maintained in the open position in which they appear in Figs. 6 and 7 but they are adapted to swing toward each other, thus permitting the horn to collapse to facilitate withdrawal of the horn from between the shoe upper and the narrow top of the cone of the last without unduly stretching the upper. To this end the parts 300 of the horn are severally rigidly secured to carrier members 302 which are hinged together by means of a pintle 304 which extends through overlapping ears on the members 302. A spring 306, coiled about the pintle 304 is arranged normally to hold the horn in expanded or open position, this position being determined by engagement of the hinged carrier members 302 with stop shoulders 308 formed on a bracket 310 to the yoked upper end of which one of the members 302 is pivotally connected by a pin 311. The carrier member 302 which is mounted upon the pin 311 is adapted to engage the pin 124 on the latch bar 120 to effect the automatic release of the last pin carrier 110 after the horn has reached the upper position shown in Fig. 21, the horn carrier having a slight amount of excess upward movement imparted thereto for this purpose by means of a rise 313 on the cam 50.

The bracket 310 which supports the members which carry the shoe horn is rigidly secured to the upper end of a tubular support 312 and this support is mounted for telescoping sliding movement upon a rod 314 which is pivoted at its lower end to swing about a horizontal shaft 316. This construction enables the pivot pin 311 to have a motion imparted thereto which is the resultant of a rearward swinging movement about the axis of the shaft 316 and the upward sliding movement of the tubular support 312 upon the rod 314, the path of this resultant motion being indicated by dotted lines at 318 in Fig. 1. As the pivot pin 311 moves through the lower portion of its path the horn H is constrained to rock about the rear edge of the last bottom as a fulcrum and to swing about the axis of the pivot pin 311 against the tension of a spring 320 which is housed within the upper portion of the tubular support 312, the spring being connected at its lower end to the support and at its upper end to an arm 322 extending from one of the hinged carrier members 302.

The tubular support 312 is rocked about the axis of the shaft 316 to impart the forward and rearward components of movement to the shoe horn by means deriving its motion from the cam 48. This mechanism comprises a cam lever 324 (Fig. 1) which is pivotally mounted upon a horizontal shaft 326 and carries a cam roll 328 arranged to ride upon the periphery of the cam. A spring 330 secured at one end to the casing 20 and at its opposite end to a downward extension of the cam lever 324 tends to hold the cam roll 328 against the cam. The cam lever 324 is made in the form of a bell crank the upwardly extending arm of which is connected by means of a link 332 with a sleeve 334 which is loosely mounted upon a horizontal rod 336 (see also Fig. 11) arranged to turn and slide in bearings formed within lugs 338 and 340 carried by the casing 20. The movement of the cam lever 324 is yieldingly transmitted to the rod 336 through the medium of a spring 342 which surrounds the rod between the sleeve 334 and a nut 344 which is threaded upon the rod 336 and is arranged to slide within the bearing lug 338. The sliding movement of the rod 336 is transmitted to the tubular shoe horn support 312 by means comprising a link 346 pivotally connected at its forward end to an ear 348 (Fig. 11) projecting from the rod 314 through a slot 350 extending lengthwise of the tubular support 312. At its rear extremity the link 346 is pivotally connected with a collar 352 carried by a bushing 354, on the rod 336, the bushing 354 being confined between collars 356, 356 which are pinned to the rod. The collar 352 is fixed to the bushing 354 by a set screw 358 which may be loosened to permit adjustment of the collar along the bushing to vary the location lengthwise of the last of the path of movement of the horn.

In order to vary the amount of tension exerted by the horn H upon the counter portion of the shoe as the horn rocks about the rear edge of the last bottom as a fulcrum, provision is made for varying the amount of compression of the spring 342 through the medium of which the yielding horizontal components of movement are imparted to the horn. To this end the rod 336 has splined thereon a spiral gear 360 (Figs. 8 and 11) the hub of which extends through and is journaled within the bearing lug 340. The bearing lug 340 is cut away, as shown at 341 in Fig. 11, to receive a collar 362 which is rigidly secured to the hub of the gear and serves to prevent axial displacement of the gear in either direction. Meshing with the gear 360 is a second spiral gear 364 fast upon a suitably journaled shaft 366 the outer end of which extends through the side of the casing 20 and is provided with a hand wheel 368 by means of which it may be turned to rotate the rod 336 to slide the nut 344 and thus to tighten or loosen the spring 342.

The tubular support 312 for the shoe horn is raised and lowered upon the rod 314 to impart the upward and downward components of movement to the horn by means of mechanism deriving its movements from the cam 50. This mechanism comprises a cam lever 370 mounted to rock about the horizontal shaft 326 and carrying a cam roll 372 arranged to ride upon the periphery of the cam 50. The lever 370 is connected by means of parallel links 374 to opposite sides of a sleeve 376 fixedly but adjustably secured to the lower extremity of the tubular support 312. The sleeve 376, which is split longitudinally, is secured to the tubular support 312 by means of binding screws 378 arranged to tighten the sleeve upon the support and a suitable key or plug 379 projects from the sleeve into the slot 350 in the support to prevent the tubular support from being contracted so as to bind upon the rod 314.

In using a machine constructed as thus far described the operation is as follows. A last, usually having a shoe already partially drawn thereover, is placed upon the last pin P while the latter occupies the upwardly tilted position shown in Fig. 22 and the last is then swung downwardly to the position shown in Fig. 17, the last pin carrier being locked to hold the last in this position. If the shoe has not been drawn on the last as far as it is practicable to do by hand before the last is placed on the last pin the manual pushing of the shoe on the last may be accomplished after the last has been placed on the last pin and swung downwardly into position for the power relasting operation. The operator then depresses the treadle 54, thus tripping the main clutch and starting the first stage of the cycle of operations. During this stage the roll R is raised into contact with the tread face of the sole (the roll engaging the sole approximately at the ball and applying heavy pressure thereto) after which the main clutch is automatically thrown out and the machine comes to rest. The engagement of the roll with the shoe serves to hold the last firmly in place upon the last pin and to hold the shoe firmly in position upon the last. During the period of rest following the first stage of the cycle the operator may use a shoe hammer or perform other manual operations to prepare the shoe for the automatic toe seating operation. The second stage in the cycle is then initiated by again depressing the treadle 54. During the second stage the relasting roll is rotated to seat the toe of the shoe upon the last and very shortly after the roll starts to turn, the shoe horn begins its movement for the purpose of seating the counter portion of the shoe. The operations of the relasting roll and the horn overlapping in this manner each of said instrumentalities is enabled to assist the other, the rearward pull of the horn supplementing the push of the roll to facilitate the seating of the toe while the push of the roll supplements the pull of the horn to facilitate the seating of the counter portion of the shoe. In addition the horn serves to guide or direct the shoe in its rearward movement upon the last and to offset any tendency of the shoe to be forced too much toward one side or the other of the last. Before the termination of this second stage of the cycle the relasting operation is fully completed, the horn is finally withdrawn from between the shoe upper and the last to the position shown in Fig. 22, the last pin carrier is unlocked, and the relasting roll is retracted from engagement with the sole to permit the removal of the last from the machine which is done after the machine comes to rest. Thereafter the operator depresses the treadle 54 for the third time initiating the third stage in the cycle during which the shoe horn is returned to the position shown in Fig. 17 ready for operation upon another shoe.

To facilitate the relasting of the toe of the shoe it is sometimes desirable for the operator to press down manually upon the shoe upper at the toe with the palm of his hand with a considerable amount of force applied so as to urge the upper forwardly relatively to the sole or otherwise to assist or modify the operation of seating the toe of the shoe. In order to facilitate manual control or modification of the relasting operation in this manner the illustrated machine, as shown in Fig. 1, is provided with a stationary hand grip, or handle in the form of a crossbar 510, the crossbar being carried by the slide 138 which supports the relasting roll and being located closely adjacent to the periphery of the roll and immediately beneath the toe portion of the shoe so that the operator, when placing the palm of his hand over the shoe, may engage the hand grip with the ends of his fingers. By seizing the hand grip he is enabled to utilize his finger muscles to augment the action of his arm and shoulder muscles and thus he is enabled to apply a greater amount of pressure to the shoe, to maintain it more steadily and effectively and to control it more sensitively during the action of the relasting roll, than he would be able to do if no hand grip were provided.

As shown, the crossbar 510 constituting the hand grip just referred to is carried between the upper ends of the arms of a yoke frame 512 which is pivoted as shown at 514 to the upper end of a post 516 which in turn is received with provision for vertical adjustment in an apertured boss 518 on the slide 138. Suitable clamping bolts 520 and 522, respectively, are provided for securing the post 516 in different positions of vertical adjustment and for securing the yoke frame 512 in different positions of angular adjustment about the pivot 514. By loosening these bolts, the location of the crossbar 510 relatively to the shoe may be adjusted as may be found desirable the better to adapt it for the operator's use.

In Fig. 14 a modified form of shoe horn is shown at H'. This horn H' is of one-piece construction and is provided upon its outer surface with a small cam-like projection $h$ for the purpose of smoothing out the upper edge portion of the shoe upper at the rear of the shoe at the beginning of the rearward and upward movement of the horn. The shoe upper is very liable to be turned or rolled inwardly at the upper rear edge of the heel of the shoe and in a machine having no special means for smoothing out the upper at this point, such as the cam projection $h$ just described it might often be desirable for the operator manually to smooth out the upper during the dwell between the first and second stages of the cycle of operations. The provision of the cam projection $h$ however enables this operation to be accomplished automatically and makes it practicable to do away with the dwell between the first and second stages if desired.

Figure 15:
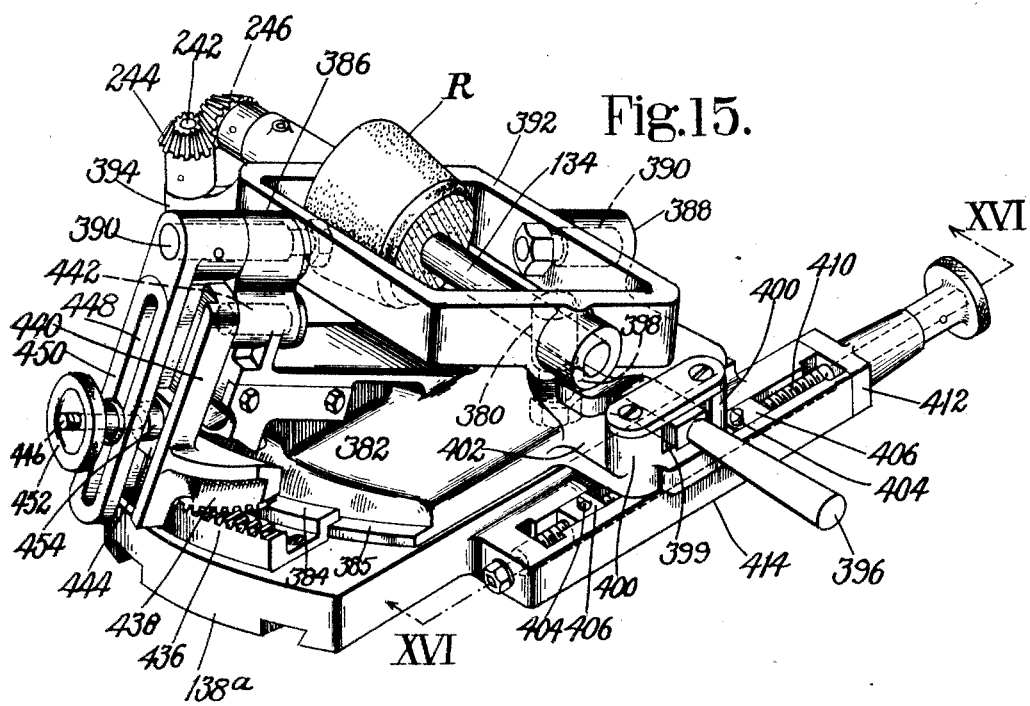
Fig. 15 is a perspective view showing a modification of the support upon which the relasting roll is mounted.
Figure 16:
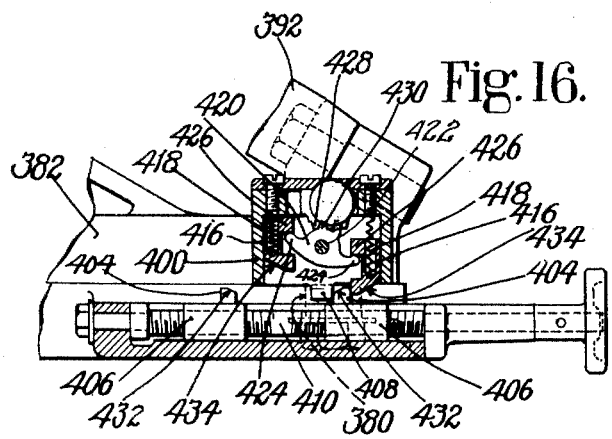
Fig. 16 is a detail view, partly in elevation and partly in section, taken along the line XVI—XVI of Fig. 15.

Before referring to the modified form of relasting roll carrier illustrated in Figs. 15 and 16 there are certain peculiarities concerning the shapes of lasts which should be borne in mind. In most lasts what may be regarded as the longitudinal median line of the toe portion of the last bottom is disposed at more or less of an angle to the longitudinal median line of the heel portion of the last bottom, this laterally offset relation of the toe and heel portions of the last being commonly referred to as the "swing" of the last. Also, in many lasts the bottom surface in the vicinity of the ball has more or less transverse inclination, this surface sloping downwardly toward the inner edge of the last bottom and this transverse inclination being hereinafter referred to as the "pitch" of the last bottom. In using the machine shown in Figs. 1 to 14, in connection with lasts in which neither the swing nor the pitch of the last bottom is excessive it has been found unnecessary in many instances to make any allowance for either the swing or the pitch referred to. In other cases it has been practicable to make suitable allowance for both the swing and the pitch by twisting the last more or less to one side or the other about the last pin and thus shifting the forepart of the shoe axially of the relasting roll to vary the direction of the push applied to the toe of the shoe and to bring both lateral margins of the sole into frictional engagement with the roll the surface of which tapers toward the middle of the roll to facilitate the latter adjustment.

In cases where the swing of the last is more pronounced it may be desirable to make some allowance or compensating adjustment therefor. As hereinafter more fully explained this is accomplished by swinging adjustment of the relasting roll and the forepart of the last toward one side of the machine or the other, it being pointed out that if no such adjustment of the roll were made the roll would be positioned with its axis perpendicular to the direction of rearward pull of the shoe horn and, while the forepart of the last could be adjusted relatively to the roll by swinging the last about the last pin so that the direction of the push exerted by the roll would be effective properly to seat the toe of the shoe, such swinging adjustment of the last relatively to the roll would twist the heel portion of the last so that its median line would be disposed at a considerable angle to the direction of rearward pull of the horn and difficulty would be experienced in properly seating the counter portion of the shoe. Accordingly, provision is made for swinging the roll R bodily in a horizontal plane toward the right or the left (depending upon whether the shoe is a right shoe or a left shoe) to such an extent that when the last is swung a corresponding amount about the last pin to centralize the ball of the sole relatively to the roll, the median line of the heel portion of the last bottom will extend in the direction of rearward pull of the shoe horn but the direction in which the roll will push the shoe relatively to the last will remain substantially the same as before the adjustment was made. Provision is also made whereby the roll may be tiltably adjusted crosswise of a last upon which it is to operate so as to adapt the roll to variations in pitch of the bottoms of different lasts.

To enable the roll R to be adjusted bodily toward one side or the other of the machine as above described a support or slide 138ª (Fig. 15), which is slidably mounted on the carrier 140 in the same manner as the previously described support 138, is provided with a post 380 upon which is pivoted for lateral swinging adjustment a head 382 which carries the roll. The lower surface of the head 382 is machined to facilitate the swinging of the head over the upper surface of the slide 138ª and the head is retained in place upon the slide by means of a flange 384 which is rigidly secured to the slide and is curved in an arc concentric with the post 380 and is arranged to overlie a similarly curved flange 385 on the head 382. Projecting upwardly from the central portion of the head 382 are spaced lugs 386 and 388 which are apertured to receive trunnions 390 projecting from the front and rear portions of a hollow rectangular frame 392 within which is journaled the shaft 134 that carries the roll R. The shaft 134 is driven, as in the construction shown in Figs. 1 to 14, by intermeshing bevel pinions 244 and 246 on the shafts 242 and 134, respectively. In order to support the shaft 242 the frame 392 is provided with an outwardly offset bearing 394 within which said shaft is journaled.

The above-described arrangement is such that the trunnions 390 extend lengthwise with respect to a shoe and last supported by the last pin and the shaft 134 is disposed at right angles to the common axis of the trunnions 390. Thus the roll R is positioned with its axis extending crosswise of the shoe. The arrangement is further such that tilting of the frame 392 about the axis of the trunnions 390 will tilt the roll to accommodate it to variations in the pitch or transverse inclination of the last bottom and swinging of the head 382 about the pivot post 380 will adjust the roll bodily toward one side or the other of a central position in the machine in the manner and for the purpose above described. The universal joints 234 and 240 and the sliding telescopic connection between the shafts 230 and 242 in the roll driving mechanism will permit the above described tilting of the frame 392 about the axis of the trunnions 390 and also the above-described swinging of the head 382 about the post 380, the roll driving mechanism being unaffected by the adjustment of the roll R either through such tilting of the frame 392 or through such swinging of the head 382.

The roll R having been adjusted by the swinging of the head 382 about the post 380 the operator will swing the last L about the last pin P a corresponding amount to centralize the toe of the shoe relatively to the roll, thus positioning the heel of the last properly with respect to the horn H. The axis of the last pin P about which the last is swung extends substantially through the center of curvature of the rear edge of the last bottom and accordingly the lateral swinging adjustment of the last will not alter the concentric relation of the curve at the rear of the last bottom to the transverse curve of the shoe horn. Since all lasts swing inwardly the relasting roll and the last will be swung toward the left side of the machine in compensating for the swing of a last for a right shoe and toward the right side of the machine in compensating for the swing of a last for a left shoe.

For the purpose of effecting the swinging adjustment of the relasting roll about the post 380 a handle 396 (Fig. 15) is provided on the head 382 which carries the relasting roll and provision is also made for limiting the extent of swinging adjustment of the head and for locking the head in adjusted position. The handle 396 is in the form of a lever and it is pivoted at 398 to the head 382. The middle portion of the handle or lever 396 extends through a horizontally elongated opening 399 formed between abutments 400 which project upwardly from a laterally offset portion 402 of the head 382. The distance between the abutments 400 is somewhat greater than the width of the lever 396 so that the lever is capable of a small amount of movement relatively to the head before engaging one or the other of the abutments 400 and thus becoming effective to swing the head. This movement of the lever 396 relatively to the head 382 is utilized to release the locking means which holds the head in adjusted position.

The means for limiting the extent of swinging adjustment of the head 382 comprises two stop pins 404 which severally are formed upon two rectangular blocks 406 and which project upwardly from the blocks into the path of a stop lug 408 (Fig. 16) depending from the offset portion 402 of the head 382. The lug 408 is located between the stop pins 404 and the latter are adapted to co-operate with the former to limit the swinging adjustment of the head 382 in either direction and thus to position the relasting roll to accommodate the swing of the last whether the last be for a right shoe or for a left shoe. The stop pins 404 are made adjustable toward and from each other to vary the extent of swinging adjustment to be imparted to the head 382 and to this end the blocks 406 are adapted to receive the opposite end portions of a right and left threaded adjusting screw 410 which is mounted to turn in bearings 412 at the opposite ends of a laterally offset portion 414 of the slide 138ª. Between the bearings 412 the offset portion 414 is slotted to receive the blocks 406 and to prevent them from turning with the screw 410 so that the rotation of the screw will act to shift the stop pins 404 equal amounts toward and from each other.

In order to lock the head 382 in adjusted position, as determined by either of the stop pins 404, a pair of latch blocks 416 are mounted for vertical sliding movements in guideways formed within the abutments 400 at opposite sides of the lug 408, each latch block 416 being spaced from the lug 408 a distance just sufficient to receive between them one of the stop pins 404. The latch blocks 416 are urged toward operative positions by means of springs 418 and they are adapted to be raised to release the stop pins 404 by means of a rocker member 420 which is located between the latch blocks and is pivoted at 422 to the offset portion 402 of the head. The rocker member 420 is provided with oppositely projecting fingers 424 arranged to engage beneath ears 426 on the latch blocks. The rocker member 420 is operated directly from the handle or lever 396 by means of rack teeth 428 on the lever which mesh with gear teeth 430 on the rocker member 420. The arrangement is such that when the handle 396 occupies a neutral or central position in the opening 399 the fingers 424 of the rocker member will be horizontally alined and both latch blocks 416 will be maintained inoperative above the plane of the stop pins 404. When the handle 396 is swung in one direction to adjust the roll for operation in connection with a last for a right shoe the member 420 will be rocked so as to permit one of the latch blocks to be spring pressed downwardly into position for operative engagement with one of the stop pins 404 and when the handle 396 is moved in the opposite direction to adjust the roll for operation in connection with a last for a left shoe the member 420 will be rocked in the opposite direction so that the other latch block 416 will be spring pressed downwardly into position for operative engagement with the stop pin 404. The arrangement is further such that when either latch block is in lowered or operative position the other latch block will be maintained in raised or inoperative position. The stop pins 404 are formed with inclined cam faces 432 arranged to coact with cam faces 434 formed on the latch blocks 416 so as to permit each latch block to ride over its respective stop pin 404 during the movement of the handle 396 for the purpose of adjusting the position of the head 382 but will be prevented from moving in the opposite direction until the latch block has been raised by movement of the handle 396 for the purpose of changing the adjustment of the relasting roll.

As shown in Fig. 15, provision is also made for utilizing the lateral swinging adjustment of the head 382 for effecting the tipping of the relasting roll R for the purpose of adapting it to the pitch of the last bottom. For this purpose the teeth of a segmental rack bar 436, secured to the slide 138ª, are adapted to be engaged by the teeth of a segment 438 formed at the lower end of an arm 440. The arm 440 depends from one end of a stud 442 which is mounted to turn in a bearing in the lug 386. The arm 440 is grooved lengthwise to provide a slideway for a rectangular block 444. A bolt 446 projects from the outer side of the block 444 through a longitudinal slot 448 in an arm 450, the upper end of which is pinned to one of the trunnions 390 of the roll carrying frame 392. The bolt 446 is arranged to turn relatively to the block 444 and the outer end of the bolt is threaded to receive a nut 452 arranged to engage the outer side of the arm 450 and to secure the block 444 against movement lengthwise of the arm 450 by clamping the arm 450 between the nut 452 and a projection 454 on the outer side of the block 444. With the above described construction, as the head 382 is swung toward either side of the machine the segment 438 is caused to roll over the stationary rack bar 436, thus swinging the arm 440 about the stud 442. Through the connections between the arms 440 and 450 the latter arm will also be swung and since this arm is pinned to the trunnion of the frame 392 which carries the roll R the frame will be swung about its trunnions and so as to tip the roll crosswise of the shoe. The amount of tipping movement to be thus imparted to the roll is determined by the adjustment of the block 444 in the groove of the arm 440 thereby changing the ratio between the amount of swinging adjustment of the head 382 and the degree of tipping adjustment of the roll R. The construction is also such that the block 444 may be shifted upwardly in the groove in the arm 440 until the bolt 446 is coaxial with the stud 442 and when the block is thus adjusted no rocking movement at all will be imparted to the arm 450 when the head 382 is swung laterally and consequently no tipping of the roll R will take place. The ratio between the degree of swing of the last and the angle of pitch of the last bottom is ordinarily the same for all sizes of lasts of a particular style and it is the same in both right lasts and left lasts. Accordingly, when the block 444 has been adjusted in the grooved arm 440 to secure a desired ratio between the horizontal swinging adjustment of the head 382 and the tilting adjustment of the roll R no change in this adjustment of the block 444 will be necessary to adapt the machine for operation upon different sizes of shoes made on the same style of lasts or for right or left shoes made on this style of last. After operating upon a right shoe the operator, merely by shifting the handle 396 from one extreme position to the other, may adjust the relasting roll for operation upon a left shoe or vice versa, and these changes of adjustment may be made without regard to the sizes of the shoe to be operated upon.

In Figs. 8, 9 and 12 the machine is shown as being provided with two supplementary foot treadles 460 and 484, the treadle 460 being connected with the mechanism for rotating the relasting roll to seat the toe of a shoe upon a last and being operative to effect rotation of said roll independently of the cam which normally controls said mechanism, and the treadle 484 being connected with the mechanism for retracting the relasting roll from engagement with the work and being operative independently of the cam which normally controls said mechanism.

The treadle 460 is pivotally mounted upon the rod 90 upon which the cam lever 256 is fulcrumed and the treadle is extended rearwardly of the rod 90 as indicated by dotted lines at 462 in Fig. 12. The mechanism associated with the treadle 460 may be operated by depression of the treadle to rotate the relasting roll during any of the periods between successive stages of automatic operation of the machine. Also, if during the automatic operation of the machine the resistance offered by the shoe to the rotation of the relasting roll causes members of the friction clutch 220 to slip prematurely or if for any reason additional rearward movement of the shoe is desired, the treadle 460 may be depressed to increase the compression of the spring tending to hold the clutch members together and thus to continue the rotation of the relasting roll so long as the treadle remains depressed. Thus, rotation of the relasting roll may be continued under the control of the operator even after the members of the friction clutch have slipped and automatic driving of the roll has been terminated. In order that this may be accomplished the connections between the friction clutch 220 and the cam lever 256 have been modified to the following extent.

As shown in Figs. 12 and 13 the lower end of the rod 264 extends through a block 464 which rests upon a collar 466 that is pinned to the shaft and supports the block against the action of the spring 268. Located within a central recess in the block 464 and mounted to turn upon a stud 468 carried by the block is a pinion 470 and mounted in vertical slideways in the block at opposite sides of the pinion are two rack bars 472 and 474, the teeth of which are arranged to mesh with the teeth of the pinion, the arrangement being such that when either rack bar is moved the pinion will be caused to roll over the teeth of the other rack bar so as to raise or lower the block 464 and thus to increase or diminish the compression of the spring 268. The rack bar 472 is connected by a link 476 with the cam lever 256 by means of which the friction clutch is automatically thrust in to drive the relasting roll. The rack bar 474 is connected by a link 478 to the rearward extension 462 of the treadle 460. As shown in Fig. 12, a guide rod 480 is secured at its lower end to the casing or frame 20 and extends upwardly through an aperture in the block 464.

In accordance with the normal operation of the machine as described in connection with Figs. 1 to 7, inclusive, the rotation of the relasting roll does not begin until the second stage in the cycle of operations. However, when the machine is fitted with the auxiliary treadle 460 the cam 46 may be set as indicated in Fig. 8 so that the relasting roll will start to rotate just before the termination of the first stage in the cycle. The cam 46 may be provided with a depressed portion to cause the rotation of the relasting roll to stop at the termination of the first stage in the cycle. With this arrangement the operator may depress the treadle 460 during the pause between the first and second stages of the cycle of operations of the machine and he may continue the rotation of the relasting roll to the extent of completing the relasting of the toe if he desires at this time. In this way the completion of the toe seating operation will be entirely under the operator's control, the amount of force which is effective to seat the shoe being determined by the operator.

The mechanism associated with the treadle 484 is best shown in Figs. 8 and 9. The treadle 484 is fulcrumed upon a fixed pivot stud 486 and is connected by a rod 488 with the tail 490 of a pawl 492 arranged to co-operate with a series of ratchet teeth 494. The pawl 492 is located within a recess in a slide block 496 to which the pawl is pivoted, as shown at 498. The slide block 496, together with a block 500 upon which the ratchet teeth are formed, is slidable in a vertical guideway formed within a lug 502 which projects inwardly from the rear wall of the casing 20. A spring 504 secured at its lower end to the tail of the pawl 492 and at its upper end to a fixed pin 506 serves to hold the pawl out of engagement with the ratchet teeth 494 and also tends to hold the slide block 496 as well as the treadle 484 in their upper positions. The block 500 upon which the ratchet teeth are formed is pinned to the lower end of a rod 508 the upper end of which is rigidly secured to a nut 156' (corresponding to the nut 156 hereinbefore described). When the treadle 484 is depressed it will operate first to engage the pawl 492 with the ratchet teeth 494 and then to lower the sleeve 158 against the force of the spring 162 and thus through the nut 156' and the links 152 to lower the relasting roll carrier 140 to retract the roll R from engagement with the shoe. Thus, by means of the treadle 484 and the associated mechanism just described the operator is enabled at any time during the automatic operation of the machine, as well as during the periods between successive stages of automatic operation, to relieve the shoe from the pressure of the relasting roll so that the shoe may be conveniently adjusted or operated upon manually as may be desired.

Certain novel features disclosed but not claimed herein are disclosed and claimed in said reissue Patent No. 18,186 and also in Letters Patent of the United States No. 1,819,440, granted August 18, 1931, on my application. United States Letters Patent No. 1,678,165, granted July 24, 1928, upon my copending application Serial No. 518,294, discloses and claims an improved method which may be practiced with the aid of the machine of this application.

Having described my invention, what I claim as new and desire to secure by Letters Patent of the United States is:

1. In a machine for relatively moving a shoe and its last, means for effecting said relative movement, and power driven mechanism for operating said means constructed and arranged to become inoperative when excessive resistance between the shoe and the last is offered to said relative movement.

2. In a relasting machine, a work engaging member for relatively moving a shoe and its last to mount the shoe on the last, and a power driven operating mechanism for said member constructed and arranged to become disconnected from its source of power when excessive resistance between the shoe and the last is offered to said relative movement.

3. In a relasting machine, power driven means for relatively moving a shoe and its last to mount the shoe on the last, and mechanism interposed in said power-driven means and controllable by the operator while relasting a shoe for controlling the amount of force applied by said means to effect said relative movement.

4. In a relasting machine, power driven means for relatively moving a shoe and its last to mount the shoe on the last, mechanism constructed and arranged to maintain within a predetermined limit the amount of force applied by said means to effect said relative movement, and operator controlled means operable during the relasting of a shoe for modifying the action of said mechanism.

5. In a relasting machine, a support for a last, a relasting roll, power means for rotating the roll to push a shoe upon the last, mechanism for stopping the rotation of the roll when a predetermined amount of resistance is encountered, and operator controlled means for modifying the action of said mechanism.

6. In a relasting machine, power driven means for relatively moving a shoe and its last to mount the shoe on the last, and mechanism for adjusting the direction of movement of said means to determine the transverse direction relatively to the last in which the force of said power-driven means is applied to effect said relative movement between the shoe and the last.

7. In a relasting machine, power driven means for relatively moving a shoe and a last having a substantial amount of swing to its forepart to mount the shoe on the last, and means for varying the direction of movement of said power-driven means to control the direction in which the force is applied by said means to effect said relative movement between the shoe and the last in accordance with the degree of swing of the forepart of the last.

8. In a relasting machine, means for relatively moving a shoe and a last to mount the shoe on the last, and means including a friction clutch for operating said means, the clutch being constructed and arranged to slip to limit to a predetermined amount the force to be applied to effect said relative movement.

9. In a relasting machine, a support to hold a last stationary, means to push a shoe rearwardly on a last held by said support, and power driven operating means for said pushing means including friction clutch members arranged to slip if undue resistance is offered to the action of the pushing means.

10. In a relasting machine, means for relatively moving a shoe and a last to mount the shoe on the last, means including a friction clutch for operating said means, and mechanism for automatically controlling the action of the clutch.

11. In a relasting machine, means for bringing a shoe seating roll into engagement with a shoe partially seated upon a last to complete such seating, means including a friction clutch for operating said means, and mechanism adapted to be actuated by the operator for controlling the action of the clutch.

12. In a relasting machine, means for relatively moving a shoe and a last to mount the shoe on the last, means including friction clutch members yieldingly held engaged for operating said means, the clutch members being constructed and arranged to slip relatively to each other to limit the amount of force to be applied to effect said relative movement, and means for varying the amount of force with which said clutch members are yieldingly held engaged.

13. In a relasting machine, a shaft, friction clutch members adapted to be driven by said shaft, mechanism adapted to be driven by said clutch members for relatively moving a shoe and a last to mount the shoe upon the last, a spring tending to hold said clutch members engaged, and means for adjusting the tension of the spring to vary the amount of force tending to hold the clutch members together.

14. A relasting machine having, in combination, a support for a last, a power-driven roll arranged to engage a shoe in which the last is partly inserted, means for rotating said roll in a direction to seat the shoe on the last, automatic mechanism for controlling the rotation of said roll, and mechanism adapted to be actuated by the operator for alternatively controlling said rotation.

15. In a relasting machine, a support for a last, a power driven roll for seating a shoe on the last, automatic mechanism for controlling the rotation of said roll, and mechanism adapted to be actuated by the operator for alternatively controlling said rotation.

16. In a relasting machine, a support to hold a last stationary, means to seat a shoe on a last held by said support, operating mechanism for said seating means including friction clutch members adapted to be held engaged under a predetermined amount of spring pressure and to become disengaged if the resistance offered to the action of the seating means becomes excessive, and operator controlled means for increasing the pressure tending to hold the clutch members engaged.

17. In a machine for relatively moving a shoe and a last, means for effecting said relative movement, automatic mechanism for moving said means into and away from position to operate upon the work, and operator controlled mechanism for moving said means away from said position.

18. In a relasting machine, means engageable with a shoe to push the shoe on a last, cam-operated mechanism for retracting said means from the shoe, and mechanism under control of the operator for retracting said means from the shoe.

19. In a relasting machine, a support to hold a last stationary, a member to hold a shoe against a last held by said support and to push the shoe on the last, said last having been partially inserted into the shoe prior to the actuation of said member as hereinafter set forth, means operating in a cycle to move said member into and out of operative engagement with the shoe, and operator controlled means operative during said cycle to withdraw said member from operative engagement with the shoe.

20. A relasting machine having, in combination, a support for a last partially inserted in a shoe, a roll constructed and arranged to seat the forepart of the shoe on the last, a horn for seating the rear part of the shoe on the last, cyclically operating mechanism constructed and arranged to cause the roll and the horn to seat the shoe on the last, and mechanism adapted to be actuated by the operator for modifying the action of the roll.

21. In a relasting machine, a support for a last partially inserted in a shoe, a roll for seating the forepart of the shoe on the last, a horn for seating the rear part of the shoe on the last, mechanism operating in a cycle to operate the roll and the horn, and operator controlled mechanism for retracting the roll from the shoe.

22. In a relasting machine, means for seating the forepart of a shoe on a last, normally automatically controlled mechanism for operating said member, and auxiliary means adapted to be actuated directly by the operator for controlling the operation of said mechanism.

23. In a relasting machine, rotary means for seating the toe of a shoe upon a last, means for seating the counter portion of the shoe upon the last, and mechanism constructed and arranged to operate the toe seating means and the counter seating means concurrently.

24. In a relasting machine, a support for a last, a relasting roll for engaging the forepart of a shoe, means for rotating the roll to seat the forepart of the shoe upon a last on the support, a horn for engaging the counter portion of the shoe, and means constructed and arranged to operate the horn to exert a rearward pull upon the shoe while the roll is pushing the shoe and to seat the counter portion of the shoe on the last.

25. In a relasting machine, a support for a last, a relasting roll, a shoe horn, and means for rotating the roll and operating the horn to seat the toe and counter portions, respectively, of a shoe upon a last on said support, said means being constructed and arranged to start the operation of the horn before the completion of the operation of the roll.

26. A relasting machine having, in combination, rotary means for seating the toe portion of a shoe on a last, counter seating means, and automatically controlled mechanism for operating the counter seating means to assist the toe seating means and to seat the counter portion of the shoe on the last.

27. A relasting machine having, in combination, a shoe horn, a relasting roll, means for operating the horn to seat the counter portion of a shoe on a last, and means constructed and arranged to drive the roll during the operation of the horn in a direction to seat the toe of the shoe and to assist the horn in seating the counter portion of the shoe.

28. In a relasting machine, automatic means for seating the counter portion of a shoe upon a last, and means for preliminarily smoothing out said counter portion to prepare it to be operated upon by said seating means.

29. In a relasting machine, a shoe horn, automatic means for actuating said shoe horn for seating the counter portion of a shoe upon a last, and a projection on the shoe horn for smoothing out said counter portion preparatory to seating it upon the last.

30. In a relasting machine, a shoe horn adapted to be positioned between a last and a shoe partially drawn over the last, a projection on the shoe horn for engaging any inturned portion at the upper margin of the counter portion of the shoe, and automatic means for operating said horn to smooth out said inturned margin and thereafter to seat the counter portion of the shoe on the last.

31. In a relasting machine, means for supporting a last partially inserted in a shoe, and a device to be engaged by the hand of an operator to facilitate the application of pressure of the operator's hand against the shoe during the relasting operation.

32. In a relasting machine, means for supporting in upright position a last partially inserted in a shoe, and a stationary handle located adjacent to the toe of the last to be gripped by an operator to facilitate the application of manual controlling pressure to the forepart of the shoe upper during the relasting operation.

33. In a relasting machine, means for stationarily supporting a last while a shoe is being mounted thereon, and a stationary grip for the hand of an operator to facilitate the application of manual controlling pressure to the upper of the shoe during the relasting operation, said grip being mounted for adjustment both toward and from and lengthwise of the shoe.

34. In a relasting machine, a support for a last partially inserted in a shoe, a shoe seating roll for engaging the bottom of a shoe on a last on said support, and a movable support for said roll, said supports being arranged to permit bodily movement of the roll toward the shoe in a direction substantially perpendicular to the shoe bottom.

35. In a machine for relasting shoes, an adjustable member for engaging the bottom of a shoe partially drawn over a last to push the shoe rearwardly on the last, and means for adjusting said member in accordance with variations in the transverse inclination of the last bottom in different lasts.

36. In a machine for relasting shoes, a support for a last, and means including a roll for engaging the tread face of the sole of a shoe partially drawn over the last and seating the toe of the shoe on the last, said roll being mounted for adjustment to tilt the axis of the roll in accordance with the pitch of the bottoms of different lasts.

37. In a machine for relasting shoes, a support for a last, means including a roll for engaging the tread face of the sole of a shoe partially drawn over the last and seating the toe of the shoe on the last, and mechanism for tilting said roll in accordance with variations in the pitch of the bottoms of different lasts.

38. In a machine for relasting shoes, a support for a last partially inserted in a shoe, a roll engageable with the sole of the shoe for pushing the shoe on the last, means for tilting the roll, and a stop for limiting the amount of said tilting adjustment to adapt the roll for operation upon lasts having a particular degree of pitch to the last bottoms.

39. In a machine for relasting shoes, a support for a last partially inserted in a shoe, a roll engageable with the sole of the shoe for pushing the shoe on the last, means for tilting the roll in opposite directions in accordance with the pitch of the bottoms of right and left lasts, and stops for limiting the extent of each of said adjustments.

40. In a machine for relasting shoes, a support for a last partially inserted in a shoe, a roll engageable with the sole of the shoe for pushing the shoe on the last, means for tilting the roll, a stop for limiting the amount of said tilting adjustment to adapt the roll for operation upon lasts having a particular degree of pitch to the last bottoms, and means for locking the roll in said adjusted position.

41. In a machine for relasting shoes, a support for a last partially inserted in a shoe, a roll engageable with the sole of the shoe for pushing the shoe on the last, means for tilting the roll in opposite directions to adjust it to variations in pitch of the bottoms of different lasts, a pair of stops arranged to limit the amount of said tilting adjustment in opposite directions for right and left lasts, and means for simultaneously adjusting said stops to vary the extent of the tilting adjustments of the roll.

42. In a machine for relasting shoes, a support for a last partially inserted in a shoe, a roll engageable with the sole of the shoe for pushing the shoe on the last, means for tilting the roll in opposite directions to adjust it to variations in pitch of the bottoms of different lasts, a pair of stops arranged to limit the amount of said tilting adjustment in opposite directions, and means constructed and arranged to adjust said stops through equal distances in opposite directions to vary the extent of the tilting adjustment of the roll for both right and left lasts.

43. In a machine for relatively moving a shoe and its last, means including an adjustable member for effecting said relative movement, and means for adjusting the angular position of said member to vary the direction of said relative movement at the heel end of the shoe in accordance with variations in the swing of different lasts.

44. In a relasting machine, a support for a last partially inserted in a shoe, a roll engageable with the sole of the shoe for pushing the shoe on the last, and means for adjusting the angular position of the roll axis in accordance with the degree of swing of different lasts.

45. In a relasting machine, a support for a last upon which a shoe is to be mounted, a roll engageable with the sole of a shoe on a last on the support for seating the toe of the shoe, the roll being tiltable to adapt it to variations in the pitch of the bottoms of different lasts and being mounted for swinging adjustment in accordance with variations in the swing of different lasts, and means for simultaneously effecting said adjustments.

46. In a relasting machine, a support for a last partially inserted in a shoe, a roll engageable with the sole of the shoe for pushing the shoe on the last, means for tilting the roll to adjust it to variations in the pitch of the bottoms of different lasts, and means for swinging the roll bodily about an axis at right angles to the axis of said tilting adjustment.

47. In a relasting machine, a support for a last partially inserted in a shoe, a roll engageable with the sole of the shoe for pushing the shoe on the last, means for tilting the roll to adjust the roll to variations in the pitch of bottoms of different lasts, means for swinging the roll bodily in accordance with variations in the swing of different lasts, and connections between said means constructed and arranged to maintain a fixed ratio between said adjustments.

48. In a relasting machine, a support for a last partially inserted in a shoe, a roll engageable with the sole of the shoe for pushing the shoe on the last, means for tilting the roll to adjust the roll to variations in the pitch of bottoms of different lasts, means for swinging the roll bodily in accordance with variations in the swing of different lasts, and connections between said means constructed and arranged to maintain a fixed ratio between said adjustments, said connections being adjustable to change said ratio.

49. In a relasting machine, means for stationarily supporting a last upon which a shoe is to be mounted, a roll for engaging the sole of a shoe on the last, means for yieldingly moving the roll from a retracted position spaced from the shoe to a position of engagement with the shoe, said means including a member having a length of stroke greater than the distance to be moved by the roll and a spring adapted to be compressed by continued movement of said member after the roll has engaged the shoe, and means for varying the distance between the roll and the shoe when the roll is in retracted position and thereby varying the amount of compression to be imparted to the spring to vary the amount of pressure to be exerted by the roll against the shoe.

50. In a relasting machine, a support for a last partially inserted in a shoe, a roll engageable with the sole of the shoe for pushing the shoe on the last, means for tilting the roll to adapt it to variations in the pitch of the bottoms of different lasts, means for swinging the roll in accordance with the degree of swing of different lasts, and a single member connected with each of said means for effecting both of said adjustments.

51. In a relasting machine, a frame, means on the frame for supporting a last right side up, a carrier mounted for swinging movement toward and from the last about an axis located below the heel portion of the last, a slide mounted on said carrier for adjustment toward and from said axis, and a roll mounted on said slide for engaging the tread face of the sole of a shoe on the last to seat the toe of the shoe on the last.

52. In a relasting machine, a frame, means on the frame for supporting a last right side up, a carrier mounted for swinging movement toward and from the last about an axis located below the heel portion of the last, a slide mounted on said carrier for adjustment toward and from said axis, a roll mounted on said slide for engaging the tread face of the sole of a shoe on the last to seat the toe of the shoe on the last, and means including a manually operable member mounted on said frame for adjusting the slide on the carrier in various positions of swinging adjustment of the carrier.

53. In a relasting machine, a support for a last, a roll for pushing a shoe on the last, a main clutch, an auxiliary friction clutch, a continuously rotating shaft connected with the driving members of said clutches, a control shaft, operative connections for driving the control shaft from the main clutch, operative connections for driving the roll from the auxiliary clutch, operator controlled means for throwing in the main clutch, and means operated from the control shaft for operating the auxiliary clutch and for throwing out the main clutch.

54. In a machine for use in the manufacture of shoes, a support mounted for rotary movement to permit angular adjustment, a pair of stops, means fixed with respect to said support for engaging said stops to limit the rotary movement of said support, and means resiliently carried by said support for entering into latching engagement with said stops respectively when said support is at its respective limits of rotary movement for locking said support in a position of angular adjustment as determined by said respective stops.

55. In a machine for use in the manufacture of shoes, a support mounted for rotary movement to permit angular adjustment, a pair of stops, means fixed with respect to said support for engaging said stops to limit the rotary movement of said support, a pair of latch blocks carried by said support, said latch blocks being independently movable to and from an operative position wherein they may enter into engagement with said respective stops when said support is at its respective limits of rotary movement for locking said support in a position of angular adjustment as determined by either of said stops, operator-controlled means for moving each of said latch blocks alternately with respect to the other to and from said operative position, and means for adjusting the relative positions of said stops.

56. In a machine for use in the manufacture of shoes, a support mounted for rotary movement to permit angular adjustment, a plurality of relatively fixed members for determining various positions of angular adjustment of said support, means carried by the support for co-operating with said members to lock the support in its respective positions of angular adjustment, and means for rotating said support from either of said positions to the other, said rotating means serving by its initial movement to unlock the locking means and by continued movement in the same direction to rotate the support.

57. In a machine for use in the manufacture of shoes, a support mounted for rotary movement to permit angular adjustment, a plurality of relatively fixed locking devices, a lock member carried by the support and engageable with said devices to lock the support in angular adjustment about the axis of rotation of the support, a handle for rotating said support to adjusted position, and means actuated by the initial movement of said handle for disengaging said lock member from one of said locking devices, whereupon continued movement of the handle serves to rotate the support and to bring said lock member into engagement with another of said locking devices.

58. In a machine for use in the manufacture of shoes, a support mounted for rotary adjustment, two relatively fixed locking devices, a lock member carried by the support having two parts movable alternately into position to engage respectively one or the other of said fixed locking devices to lock the support in angular adjustment about the axis of rotation of the support, a handle for rotating said support to adjusted position, and means actuated by the initial movement of the handle for moving one of the parts of the lock member out of engaging position with one of said locking devices and the other part into position to be engaged by the other of said locking devices, whereupon continued movement of the handle serves to rotate the support about its axis and to cause the other said part to engage its respective lock member.

59. In a machine for use in the manufacture of shoes, a support movable for adjustment along a predetermined path, a plurality of fixed members for determining the various positions of adjustment of said support, means carried by said support and co-operating with said fixed members to lock the support in the respective positions determined thereby, and means serving by its initial movement to unlock said locking means and by its continued movement in the same direction to move said support along said path.

60. In a machine for relatively moving a shoe and a last, a rotary shoe-engaging member for effecting such movement, supporting means for said member having a positive universal angular adjustment in relation to the last, and power-operated means for rotating said shoe-engaging member.

61. A positioning device for a tool adapted to operate upon a shoe, comprising a frame adapted to carry the tool, and means for angularly adjusting said frame about two non-parallel axes constructed and arranged to determine the adjustment about one of said axes automatically by the adjustment about the other of said axes.

62. In a machine for relatively moving a shoe and its last, a support for a last partially inserted in a shoe, a frame, a roll carried by said frame and engageable with the sole of the shoe for moving the shoe relatively to the last, means for angularly adjusting said frame about two non-parallel axes to accommodate variations in the pitch and in the swing respectively of different lasts, and means for rotating said frame about a third axis non-parallel to either of the first-mentioned axes to bring said roll into and out of engagement with the sole of the shoe.

63. In a machine for relatively moving a shoe and its last, a support for a last partially inserted in a shoe, a movable frame, a roll carried by said frame and engageable with the sole of the shoe for moving the shoe relatively to the last, and means for mounting said frame so as to confine the movement thereof to rectilinear translation to vary the point of engagement of said roll with the shoe lengthwise of the shoe and to rotation about three mutually non-parallel axes to accommodate variations in the pitch of different lasts, to accommodate variations in the swing of different lasts, and to bring said roll into and out of engagement with the sole of the shoe respectively.

64. In a machine for relatively moving a shoe and its last, a support for a last partially inserted in a shoe, a movable frame, a roll carried by said frame and engageable with the sole of the shoe for moving the shoe relatively to the last, and means for mounting said frame so as to confine the movement thereof to rectilinear translation to vary the point of engagement of said roll with the shoe lengthwise of the shoe and to rotation about three mutually non-parallel axes to accommodate variations in the pitch of different lasts, to accommodate variations in the swing of different lasts, and to bring said roll into and out of engagement with the sole of the shoe respectively, said mounting means being adapted to support the frame in any of the positions it may assume in its path of movement.

65. In a machine for relatively moving a shoe and its last, a support for a last, a roll for engaging the bottom of a shoe on the last, a supporting frame for said roll, means for angularly adjusting said frame about an axis non-parallel to the axis of rotation of said roll to accommodate the pitch of the last, and driving means for said roll constructed and arranged to cause said roll to rotate in contact with the bottom of the shoe and thereby to move the shoe relatively to the last.

66. In a machine for relatively moving a shoe and its last, a shoe-engaging roll, means for supporting said roll in a plurality of positions, and driving means for said roll comprising a pair of universal joints and an extensible member interposed between said joints to accommodate the various positions of said roll.

67. In a machine for relatively moving a shoe and its last, a plurality of shoe-engaging members, driving means for said members, mechanism for causing said driving means to operate said members in a cycle for effecting said relative movement, and means for causing said driving means to continue the operation of one of said members at the will of the operator and independently of the cycle determined by said mechanism.

68. In a machine for relatively moving a shoe and a last, means for effecting said relative movement, mechanism for operating said means, automatic mechanism for stopping the operation of said means by said operating mechanism, and operator-controlled mechanism for continuing the operation of said means by said operating mechanism independently of said automatic mechanism.

69. In a machine for moving a shoe relatively to a last, a plurality of members for engaging a shoe on the last to effect such movement, driving means adapted to be started by the operator and to stop automatically for actuating one of said members, and other driving means controlled by the first said driving means for actuating another of said members.

70. In a machine for moving a shoe relatively to a last, means for engaging a shoe on the last, a plurality of members for imparting various movements to said shoe-engaging means to move the shoe relatively to the last, driving means adapted to be started by the operator and to stop automatically for actuating one of said members, and other driving means controlled by the first said driving means for actuating another of said members.

71. In a machine for moving a shoe relatively to a last, a shoe-engaging member having a plurality of movements to effect relative movement between the shoe and the last, power-driven means for effecting said movements of the shoe-engaging member, automatic means for controlling said power-driven means, and operator-controlled means for initiating and continuing one of said movements of the shoe-engaging member independently of said automatic means.

In testimony whereof I have signed my name to this specification.

ARTHUR F. PYM.